(12) United States Patent
Chilman

(10) Patent No.: US 6,327,926 B1
(45) Date of Patent: Dec. 11, 2001

(54) DIRECTIONAL CLUTCH

(75) Inventor: John Alfred Chilman, Painswick Glos. (GB)

(73) Assignee: Satellite Gear Systems Ltd., Dublin (IE)

(*) Notice: Subject to any disclaimer, the term of this patent is extended or adjusted under 35 U.S.C. 154(b) by 0 days.

(21) Appl. No.: 09/463,286

(22) PCT Filed: May 13, 1998

(86) PCT No.: PCT/EP98/02809

§ 371 Date: Jan. 20, 2000

§ 102(e) Date: Jan. 20, 2000

(87) PCT Pub. No.: WO99/09336

PCT Pub. Date: Feb. 25, 1999

(30) Foreign Application Priority Data

Aug. 13, 1997 (DE) .............................................. 197 34 962

(51) Int. Cl.$^7$ .................................................... F16H 29/04
(52) U.S. Cl. ............................... 74/117; 280/236; 475/170
(58) Field of Search ...................... 74/116, 117; 475/166, 475/170; 280/236

(56) References Cited

U.S. PATENT DOCUMENTS

| 2,081,373 | * | 5/1937 | Viscasillas | 74/117 |
| 4,892,506 | | 1/1990 | Wen | 280/236 X |
| 5,127,883 | * | 7/1992 | Wen | 280/236 X |

FOREIGN PATENT DOCUMENTS

| 359 583 | 2/1962 | (CH) . |
| 0 303 531 A2 | 2/1989 | (EP) . |
| 0 336 033 A1 | 10/1989 | (EP) . |
| 469 758 | 7/1937 | (GB) . |
| 946 682 | 1/1964 | (GB) . |
| WO 95/03503 | 2/1995 | (WO) . |

* cited by examiner

Primary Examiner—Allan D. Herrmann
(74) Attorney, Agent, or Firm—Herbert Dubno; Andrew Wilford

(57) ABSTRACT

The invention relates to a directional clutch with a drive element (10–120) and an output element (11;101, 102;130, 131) between which clamping elements (13, 14, 110) are arranged. Said clamping elements are connected to the output element in such a way that they turn without moving in relation to the direction of rotation of the output element both in a free-running position and in a torque transmitting position. The clamping elements are moved in a ring-shaped guide element (12) of the driving element in the free-running position and are blocked in said guide element (12) in the torque transmitting position. According to the invention, the output element consists of radial guides or borings (17;103, 104) each containing a projecting clamping body pin (15, 16;111). In the first-mentioned case, the output element can be adjusted in an off-center position relative to the driving element. When adjusted in an offset position the clamping elements cyclically pass through a torque transmitting load path and a load-free path and transfer the occurring torque as they pass from the load-free path to the arched load path through non positive and/or positive engagement with the driving element.

10 Claims, 20 Drawing Sheets

DIRECTIONAL CLUTCH

CROSS REFERENCE TO RELATED APPLICATIONS

This is the U.S. national phase of PCT application PCT/EP98/02809 filed May 13, 1998 with a claim to the priority of German application 197 34 962.5 itself filed Aug. 13, 1997.

FIELD OF THE INVENTION

The invention relates to a direction-controlled transmission (free-running clutch) with an input element and an output element between which coupling elements such as coupling bodies, coupling rollers or coupling pawls are arranged that themselves or together with bodies connected to them both in the free-running position as in the torque-transmitting position are connected in the rotation direction of the output element with same and which in the free-running position move in an annular guide of the input element and in the torque-transmitting position are wedged on this guide.

BACKGROUND OF THE INVENTION

With prior-art known free-running or slip clutches, torque transmission takes place by means of pawls, coupling bodies, or balls that fit between the input and output elements. For example with a bicycle free-running hub, balls are used so that if the input shaft turns faster than the housing, the balls are urged outward by the shape of grooves in the shaft and wedge solidly between the input and output shafts so that the housing is entrained. If on the contrary the housing turns faster than the input shaft, the balls move inward in the grooves so that there is no force transmission.

All these clutches have in common that the coupling element is positioned radially between the input and output elements where it either in the coupling position blocks relative movement between the input and output elements or in the free-running position permits relative movement of the input element and the output element.

In order to make the free-running clutch simpler and cheaper to manufacture even with these functions, German 2,452,650 proposes a free-running clutch with nonround coupling bodies between an inner and an outer coupling ring and out of contact when slipping with the faster coupling ring, the coupling bodies each being held against the faster ring when slipping by means of a part-cylindrical surface parallel to the body axis. The clutch has an inner coupling ring fixed on a shaft and a concentric outer coupling ring on another shaft concentric with the inner ring. The gap between the two coupling rings holds nonround coupling bodies of which each has a bore extending parallel to its pivot axis and by means of which it is mounted on a hardened pivot bolt. The ends of the pivot bolt projecting past the coupling bodies are each force fitted in a bore seat of an inner annular flange of the outer coupling ring. The bore in the one flange and the surface formed by the pivot bolt also form the coupling surface for the outer coupling ring.

WO 95/03503 describes a steplessly or almost steplessly variable positive-contact planetary-gear transmission with input and output elements that have several wheels that together form a planet wheel that are in permanent mesh with a sun wheel. The ratios of the effective radii of the planet wheel and the sun wheel and the relative eccentric positions of the planet wheel and the sun wheel which can be varied by various means determine the speed relationship between the input and output elements. The wheels forming the planet wheel cyclically run, when set eccentrically to the sun wheel, through a torque-transmitting load path and a load-free path, the wheels rotating both about the planet-wheel axis and via respective one-way clutches about their own axes. On moving from the load-free path to the arcuate load path the wheels as a result of meshing block their actual rotation and transmit the applied torque. Any irregularity in the torque transmission is compensated for by variation of the radii determined by the load arc and/or the effective tangential component in a cyclical manner.

OBJECT OF THE INVENTION

It is an object of the present invention to provide a new directionally controlled transmission that is simple to build and that permits the transmission of considerable torque.

SUMMARY OF THE INVENTION

This object is attained by the transmission according to the invention which is usable as a steplessly or almost steplessly variable transmission or with no eccentric adjustability of the input element relative to the output element to provide a constant transmission ratio between the input and output elements. Basically however for both parts of the same embodiment the same advantages are usable to the same extent with both solutions.

According to the invention the output element has radial guides in each of which a projecting coupling-body pin or an element connected with the coupling body is radially guided and the output element is moveable eccentrically to the input element, the coupling elements when eccentric moving cyclically through a torque-transmitting load path or zone and a load-free path or zone and when moving from the load-free path to the torque-transmitting load path the applied torque is transmitted from the input element by force and/or structural engagement.

The claimed transmission includes embodiments where the input element has the described radial guide and the output element the annular guide. In a two-stage embodiment of a transmission one stage has the annular groove or body and the following stage the radial-groove disk so that stable phase positioning is obtained to reduce irregularities.

With this solution the coupling elements serve according to the invention direction both as sliding as well as force-transmitting elements without any further parts such as balls or roller cages, coupling grooves, or other inertially working coupling parts being necessary. Wedging of the coupling elements is initiated in only one part, namely the guide of the input element formed as an annular groove or body, so that separate pivoting or mounting on the input or output elements is not necessary. The hitherto necessary formation of an inner and an outer ring between which the coupling elements are mounted can be eliminated. In the simplest case the coupling elements themselves or their parts projecting out of the annular groove of the input element are coupled rotationally to the output element. The invention includes also embodiments where movable with the coupling elements in the guide or annular groove of the input element are bodies that are connected with the coupling elements and that serve as torque-transmitting elements rotationally coupled with the output element. The basic idea of the invention includes thus all arrangements where the coupling force does not—as in the transmissions according to the state of the art—transmit forces between separate bearings and shafts, thereby giving the advantage that only the substantially smaller tangential force between the coupling elements and the guides is effective during torque transmission.

In order to obtain with the transmission not only transmission ratios in the neighborhood of 1:1 but also to provide other transmission ratios, the transmission is set up as a gear drive such that the output element has radial guides in each of which is arranged for radial movement a projecting coupling-body pin or an element connected with the coupling body, the output element being adjustable eccentrically relative to the input element, the coupling elements running cyclically with eccentric positioning through a torque-transmitting load path and a load-free path in the described manner. In this manner one achieves stepless control of the rotation speed with good drive safety and a long service life. Speed variations as can occur with V-belt transmissions as a result of slip are eliminated.

Thus the input element is a disk with generally radially extending grooves as radial guides or alternatively can have a sort of gear wheel as output element in the form of a shaft with radially projecting arms whose axial surfaces are formed as radial guides and that the respective projecting coupling-body pins or the elements connected with the coupling bodies when passing through the arcuate load path transmit torque to the arms and when passing through the load-free path are entrained by entrainment connections, preferably a wire or an elastic ring, from the closest arm of the shaft. In this alternative arrangement the spaces between the arms act as guides of the output element for the above-described pins. The coupling elements themselves are moved in annular grooves of the input element about a pivot axis that is parallel or transverse to the pivot axes about which the coupling elements when moving from the torque-free to the torque-transmitting path are tippable. Torque can be transmitted through a single-end or double-end projecting pin that is part of the coupling element and that engages in a seat (guide) of the output element. Alternatively it is also possible to laterally hold the coupling element in the annular groove of the input element with a fork that is jointly guided with the coupling element in the annular groove, the fork having a pin on the side turned away from the coupling element that engages as described above in a seat of the output element.

As already described the annular guide of the input (or of the output) element is comprised of an annular groove in which the coupling element can slide or wedge or by a ring body that is gripped by slidable or wedgeable coupling elements or that is gripped frictionally by pivoting.

According to a particularly preferred embodiment the coupling element is so guided and shaped that it has only one degree of freedom necessary to pivot from the load-free path to the torque-transmitting path. As a result of this two-part transmission of force there is no canting of the coupling elements since movements other than the desired tipping are not possible. Both the pivot axis of the coupling element as well as the rotation axis of the input element and of the output element are substantially parallel. In a concrete embodiment the projecting coupling-body pin or an element connected with the coupling body has two parts engaged in radial guides of the output element, the coupling body preferably having a pin projecting vertically from the surface of the annular groove and on whose end turned toward the coupling body is arranged a coupling-body pin with a longitudinal axis parallel to the annular groove and whose end fits in respective radial guides of a two part output element, the two disks of the output element or the shaft with parts formed as radially projecting arms being connected together and arranged to both sides of the input element.

The grooves of the disk-shaped output element are preferably made arcuate in order to obtain the greatest possible uniformity of torque transmission with an eccentric offset. The coupling-body pins can be round or nonround in section.

Alternatively to the above-described embodiments, and particularly in drives where for space reasons a disk-shaped output element that is eccentrically movable relative to the input element is not desired or not usable because of its size, it is possible to provide in the eccentrically movable output element a radially displaceable slide that is rotationally coupled with the coupling body or a body coupled thereto. In this case the radially movable slide acts as an eccentric that can be adjusted according to the set radial spacing from the input-shaft axis to produce a different rotation speed of the output element.

As mainly described with respect to a planetary-gear drive that is provided with conventional prior-art clutches, it is known to make the transmission according to a further embodiment of the invention such that irregularities of torque transmission are compensated for by variation of the effective radius defined by the effective load curve and/or the effective tangential component through cyclic at least partial adjustment. The coupling elements move successively in the annular groove with eccentrically offset input and output elements (or slide) through a torque-transmitting load path and a load-free path, torque peaks or other irregularities being catchable at the output point. A first variant has already been described with reference to arcuately shaped radial grooves of the disk-shaped output element. It is similarly possible to catch irregularities of slip control with elastic elements or, when using pawl-like slip elements, to control the transmission ratio so as not to use tiny steps, but to select bigger steps of the transmission ratios so that the pawl or ramp width of the pawl-type free-running clutch are set such that there are no sudden changes of load.

In a concrete embodiment of the invention the rotation conversion between the input element and the output element is effected in two or more stages. To this end preferably the transmission means between the two stages, which preferably are formed as two disks, are formed as elastic connecting elements. The connecting elements can be knee levers that carry out a cyclic controlled or spring-biased flexing. The actual knee levers can be guided in the load path radially by cams, formations, or multipart links or other mechanism. Irregularities of torque transmission or of the transmission ratio can also be carried out by a force-dependent spring biasing and/or by hydraulic, pneumatic, or mechanical counterweighting. With conversion in two or more stages the phase shift of the stages is set such that irregularities in the stages are compensated against each other or the stages are out of phase with one another. With a two-stage drive the load path can be set so that they are offset by 180°. Preferably the number of coupling elements in each drive stage with even-number stages is the same, while with uneven-number stages the phase offset is preferably done by a central star disk.

It is also possible in multistage drives to select clutches with rotationally opposite and/or switchable slippage or to use a reversing shaft or a controllable shaft with two parallel shafts.

Finally, the input element can be split such that a counterrotating shaft and a planetary-gear adjusted shaft are hooked up as a planetary-gear drive so that the driven (third) shaft of the planetary setup can be adjusted by addition of the driven shaft steplessly with an increased adjustment range.

The coupling elements that preferably are moved in the annular groove about a rotation axis tip when moving from the torque-free position to the torque-transmitting position into a position where they frictionally engage in the described annular groove. In this manner they run in the annular groove through a slide movement whose (slide) path is dependent on the path along which the coupling bodies move from the first line or point contact with the annular-groove wall to a small surface contact of the coupling element with the annular groove. This follows from Hertzian theory according to which pressing of substantially round bodies on a plane or a surface with a large radius of curvature produces flattening. Between the first contact of a coupling body and the annular groove and the wedged position there is thus relative movement of the coupling element (or the output element connected to it) and the input element. The slide path is indeed minimizable by choosing a material with extremely small deformation, but nonetheless influences efficiency and wear as a result of the considerable forces involved and the high switching frequency during use as a stepless drive is influenced. In order to minimize wear of the coupling elements and to increase the efficiency of the transmission, the coupling elements are comprised of a single- or multiple-part base and of a single- or multiple-part contact body which wedge in the torque-transmitting position in the guide of the input element. By replacing the one-piece relatively large coupling body with a multipart coupling element, the above-described slide path and thus the coupling-body wear created by use are minimized. The reduction of the slide path increases the efficiency of the transmission.

According to a further embodiment the contact body is comprised of one or more rollers which when wedged and/or moving roll in the guide. The actual rollers (contact bodies) are guided in the base and run when sliding in engagement with the annular groove or guide as rollers so that there is very little running resistance. The transition from the torque-free to the torque-transmitting path, that as is known is associated with a deformation of material (flattening of the wedged-together surfaces) is as a result not critical since with this the rolling takes place with negative acceleration until the two parts are not moving relative to each other. The forced rolling ensures that the wedging together of the surfaces changes so that the service life and safety is increased with less wear (pitting).

Biasing in a contact position that is necessary for an accurate wedging or dead path is effected preferably by at least one spring which bears directly or indirectly on the contact body in a direction pressing the contact body on the groove walls.

Preferably the spring or wedging elements connected hereto, preferably rollers or balls, are braced on surfaces of a further annular groove that is formed in a floor of the annular groove. A pin or roller can travel in this annular groove and presses via a spring connected therewith with the contact body. Such an arrangement preferably makes it possible to form particularly narrow coupling elements (coupling bodies) that allow one to accommodate more coupling bodies in each input and output disk without them coming into contact with one another in particular eccentric positions.

According to a further embodiment of the invention the contact bodies each have an axially directed pin that engages in a seat of the output element for transmitting torque. According to a further embodiment of the invention both contact bodies of a coupling element have an axially projecting pin and are thus axially shiftable and alternatively only one of the pins serves for transmitting torque. In this manner one achieves simple switching of the slip direction according to which pin of the two contact bodies engages in a seat of the output element.

Instead of the described rollers or balls in a further embodiment of the invention particularly intended for transmitting of particularly high torques, contact bodies are used with a nonround cross section that have a surface portion that generally corresponds to the shape of the annular groove which it engages frictionally when in the torque-transmitting position. With this arrangement it is admittedly no longer possible for the contact body to roll, but there is, instead of the line contact produced by a roller or ball when moving into the wedged position, full surface contact that can take higher loads. In practice as a result, contact forces can be increased by a factor of $10^2$ with a corresponding increase in transmittable torque. On the inner side, that is directed toward the base, the shape of the contact can be made such that in the wedged condition there is surface contact which can take during torque transmission loads that are greater by a multiple. Preferably the surface of the contact body that is in surface contact with an annular-groove wall for frictional contact has a radius of curvature which corresponds to the radius of curvature of the annular-groove wall, the ratio of these radii being to minimize Hertzian pressure between 0.6:1 and 1.4:1, preferably between 0.8:1 and 1.2:1. In the range between light contact to full wedging (torque-transmitting position) the contact bodies do not slip and lie without moving on the annular-groove surfaces while the rotation of the parts of the base that is necessary to take up the normal forces forms at all locations a low-loss and low-friction rolling movement. Preferably the shapes between the base body and the contact body, which are opposite each other, are circular.

The biasing thus takes place by spreading of the contact bodies (or contact surfaces) with a spring or elements connected thereto which are braced in a further annular groove in the base of the annular groove.

Since the coupling angle at about 4° for wedging (coupling angle smaller than the arctan of the coefficient of friction) is very small, the coupling bodies are in principle very sensitive to tolerances and wear. Thus as soon as, because of wear, the overall length of the coupling body has grown smaller than the coupling gap, there is the danger that the coupling bodies invert. In order to prevent this according to a further embodiment the invention the base is formed of two parts that engage each other with opposite surfaces that are convex, preferably formed as a logarithmic spiral. As a result the height of the coupling body can be maintained constant when the contact body has worn down to a shorter height. The thus increasing rotation of the contact body when wedging thus produces an automatic adjustment.

In order to avoid rotation of the described coupling elements in order to minimize the sensitivity to tolerances and wear, according to a further embodiment of the invention the contact bodies are formed as coupling rollers that are guided on a base that is prevented from rotating relative to a central axis of the groove, preferably by pins in sleeves connected with it and that are guided in an annular groove of the input element. The opposite sides of the base on which one of the coupling rollers engages extend diverging toward one end, they preferably being formed of circular shape and constructed of circles whose radii are essentially the same size both offset from the actual contact point of the base with the respective coupling roller by an angle, preferably below 10° and further advantageously pivoted by 4° in the opposite direction.

In order to decrease slip-entraining torques in the slip mode further, according to a further embodiment of the invention the coupling bodies are not spring-biased but are only engaged on the location where they must be locked by a stationary spring, an air or lubricant stream, or a magnet.

Preferably the transmission can be set as an adjustable drive for motor-vehicle accessories such as air conditioners, lights, or the like. The described accessories are driven according to the state of the art by means of a v-belt drive so that the instantaneous engine speed determines the rotation speed of the accessory drive. With an air conditioner it is clear that when idling there is inadequate cooling of the passenger compartment which is more noticeable since motion-induced ventilation are not or are only slightly reduced. A controllable drive according to the invention can provide relief by increased output speed. The same is true for the lights or other subassemblies.

The alternative solution is characterized in that the output and input elements are each formed as two parts, that is each with two axially offset parts, the input or the output element being formed of two axially offset disks with bores in each of which engages a projecting coupling-body pin or element connected therewith such that a tangential force and thus torque can be transmitted between the pin and the disk and so that with a generally mirror-symmetrical arrangement of the input and the output element a generally homogenous stress distribution is obtained. Unlike the other solution the radial distance of the described coupling-body pins to the input and the output shafts is constant. Except for the parts that serve for the eccentric offsetting of the input and output elements, this embodiment operates like the above-described systems.

Preferably the coupling elements are comprised of a single- or multiple-part base and of a multiple-part contact body which wedge in the torque-transmitting position in the guide of the input element, the coupling surfaces of the contact bodies being part circular so that surface contact is produced generally in the contact zone with the ring disk, the Hertzian pressure being minimized by matching radii of the contacting surfaces of the ring disk and the contact body. The ratio of the radius of the contact-body surfaces and the radius of the ring disk that engage each other frictionally in the torque-transmitting position lies between 0.6:1 and 1.4:1, preferably between 0.8:1 and 1.2:1.

BRIEF DESCRIPTION OF THE DRAWING

Embodiments of the invention are shown in the drawings. Therein.

SPECIFIC DESCRIPTION

Figure 1:
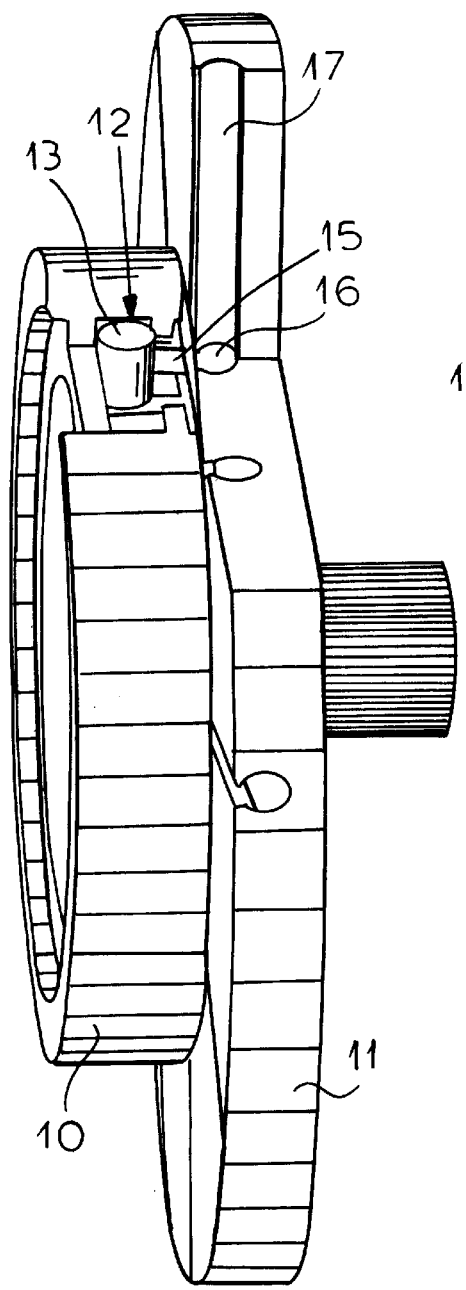
FIGS. 1 and 2 are perspective views of a transmission according to the invention
Figure 2:
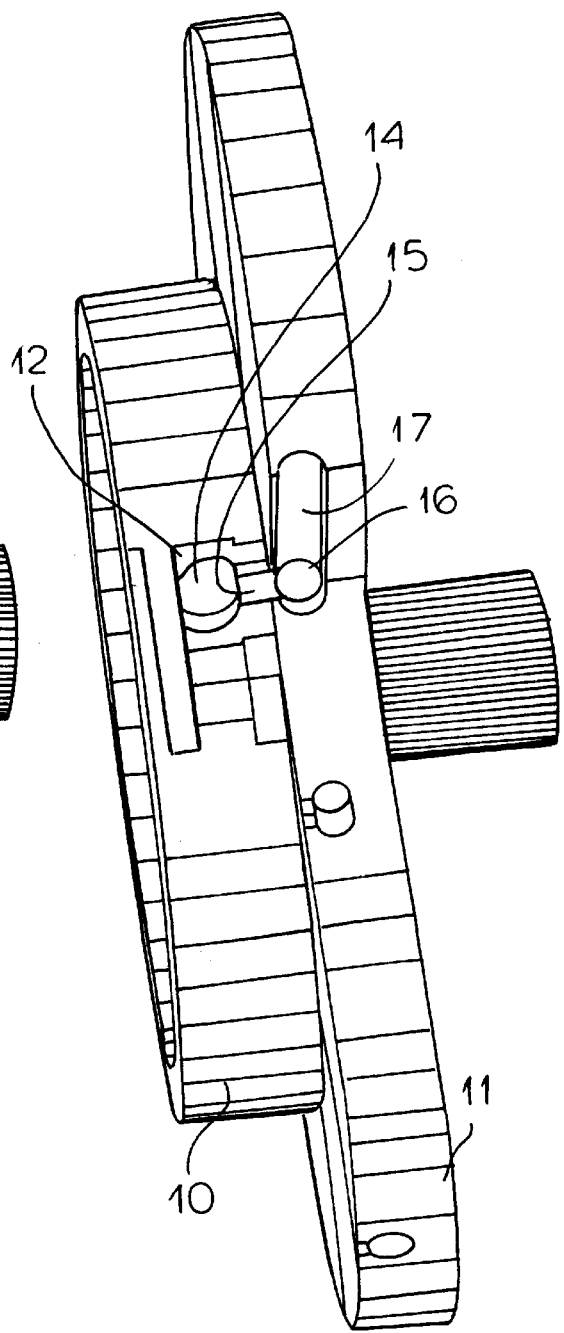
Figure 3:
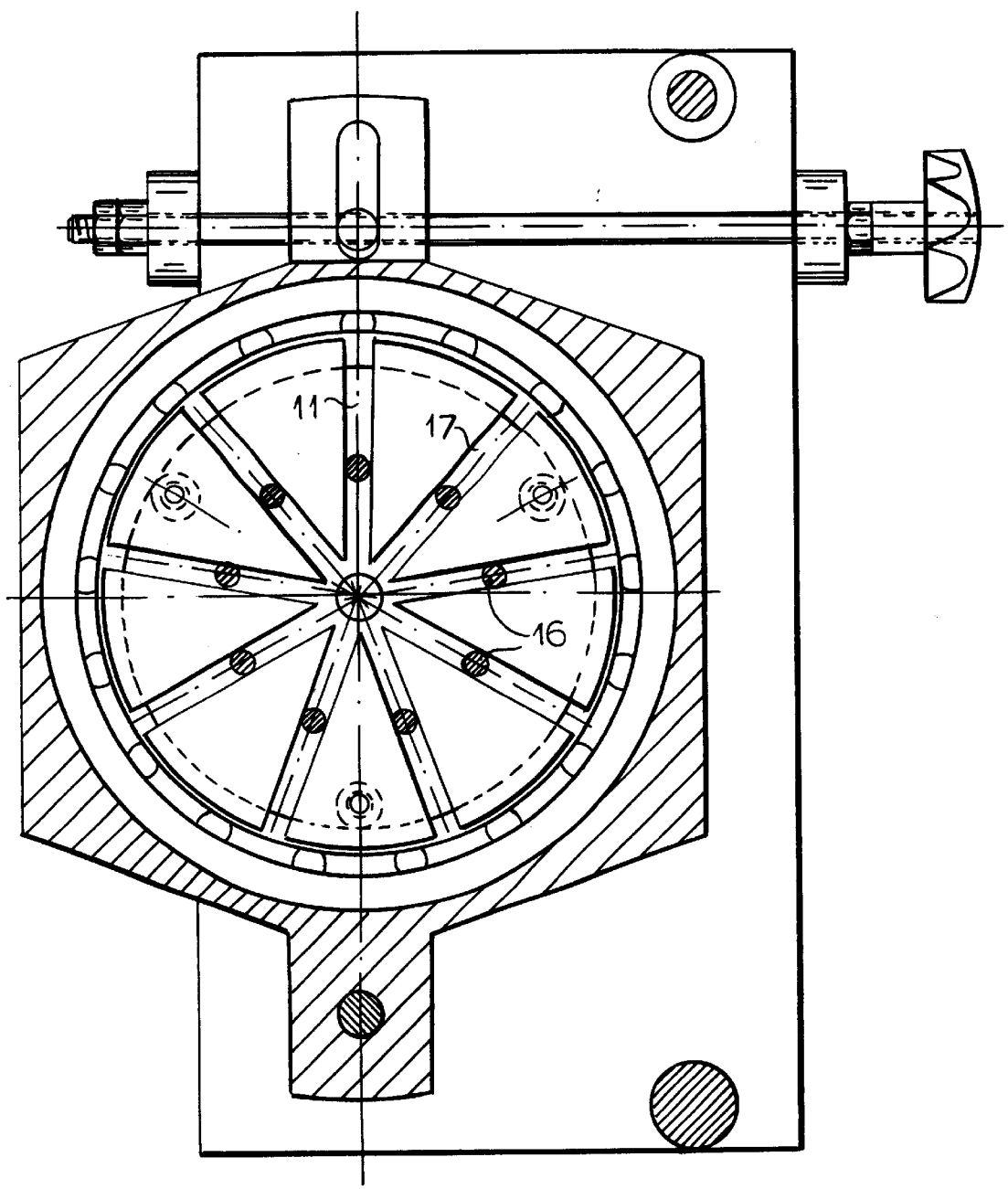
FIG. 3 is a top view of an output element.

The transmission shown in FIGS. 1 and 2 has a disk input element 10 and an output element 11. The input element 10 has an annular groove 12 in which coupling elements 13 and 14 are moved circularly. These coupling elements 13 and 14 each have a projecting pin 15 whose enlarged end 16 is seated in radially extending grooves 17 of the element 11. With the input and output disks 10 and 11 coaxial the transmission ratio is 1:1, the parts acting as coupling elements circulating freely in the groove 12 in the freewheel mode. In the coupling mode the coupling bodies wedge in the groove 12 so that torque applied to the disk 10 is transmitted to the output disk 11. The radial position of the coupling bodies 13 and 14 and the pin 15 or the enlarged head 16 is shown by way of example in FIG. 3 for a transmission ratio of 1:1.

Figure 4:
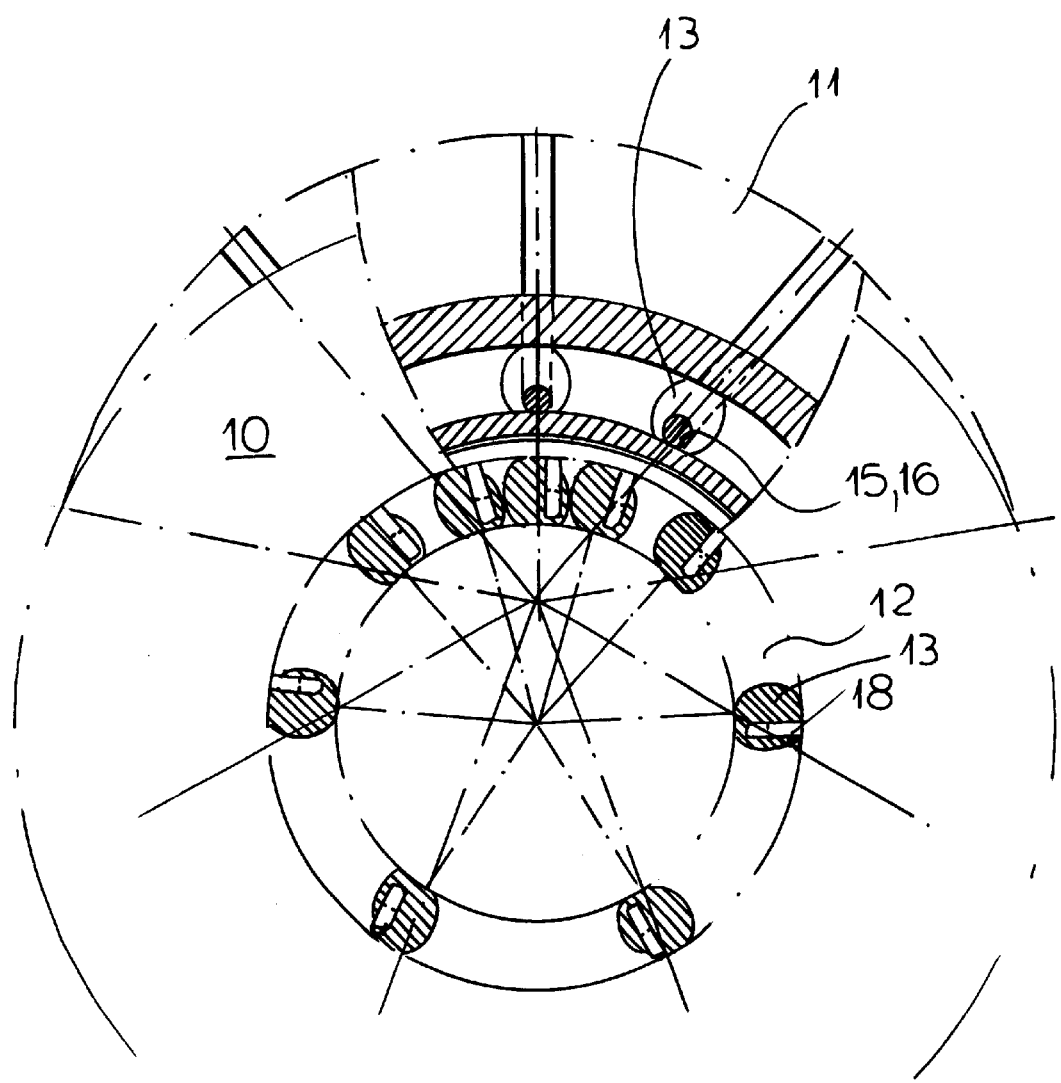
FIG. 4 is a partial sectional view through a transmission acting as a drive unit.

When the input disk 10 is eccentric to the output disk 11 the angular or tangential offset of the coupling bodies 13 in the groove 12 changes as shown in FIG. 4. The coupling bodies 13 thus pass through a torque-transmitting load path (in the upper region of the groove 12) and a load-free path (in the lower region of the groove 12). The pins 15 or their enlarged heads 16 can according to the eccentric offset move radially in the groove 17 but they remain rotationally coupled with the output disk 11. Movement of the coupling bodies 13 from the locked condition into the free-running condition is assisted by spring-loaded pins 18 as is known in free-running clutches according to the state of the art.

Figure 5:
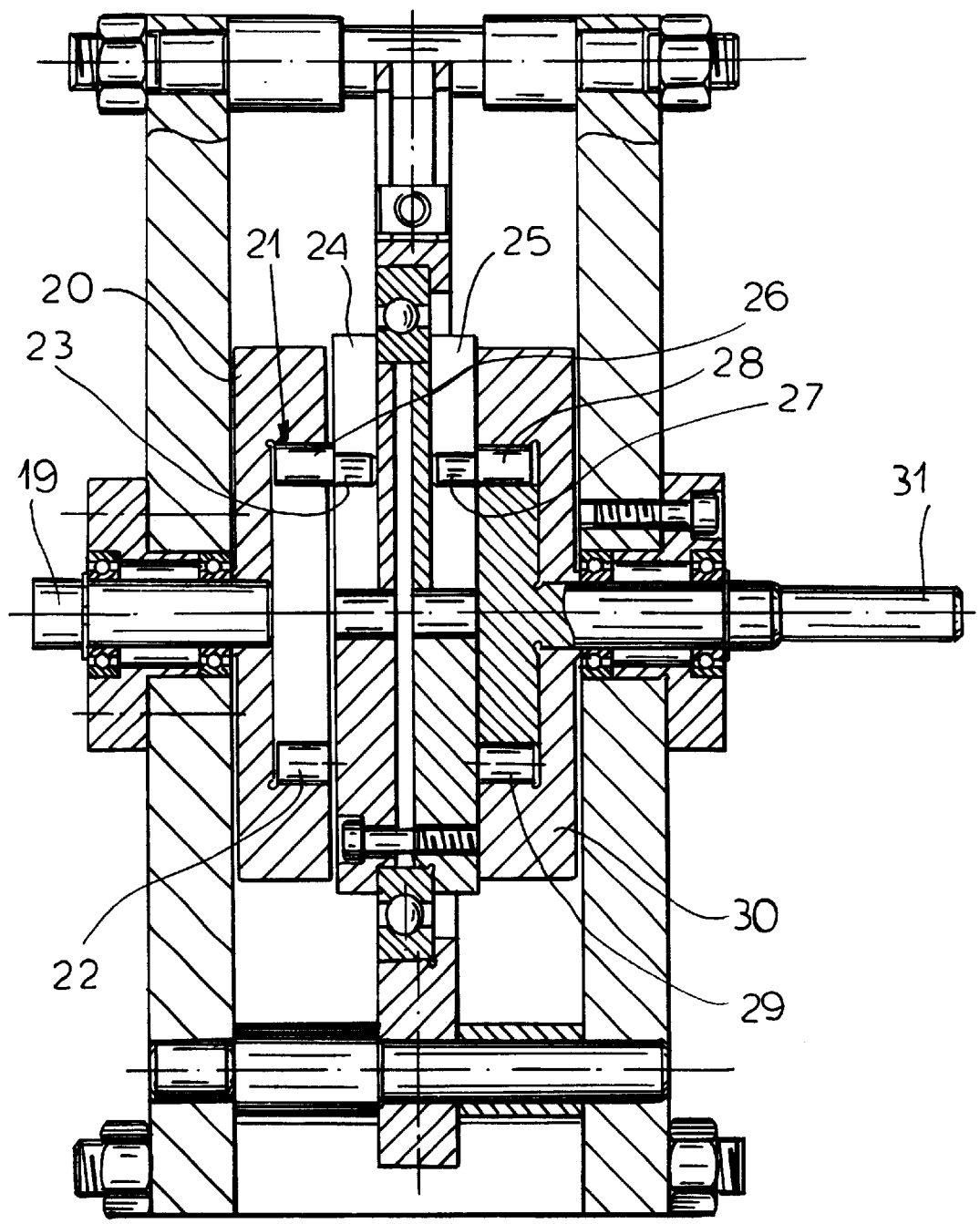
FIG. 5 is a multistage drive unit.

The transmission used as a two-stage drive unit is shown in FIG. 5. In the illustrated embodiment the rotation of an input shaft 19 is transmitted to an input disk 20 whose annular groove 21 holds coupling bodies 22. These coupling bodies 22 have axially projecting pins 23 that engage in radial grooves 24 of a star disk 25 so that rotation of the input disk 20 is transmitted in the coupling mode of the coupling bodies to the star disk 25. The star disk 25 is made mirror symmetrical relative to a transverse plane and has, in line with the annular grooves 24, annular grooves 26 on the opposite side in which engage respective pins 27 of coupling bodies 28 that are circularly movable in a corresponding annular groove 29 of an output disk 30. In the coupling mode of the coupling elements 28, rotation of the star disk 25 is transmitted via the output disk 30 to the output shaft 31.

Figure 7B:
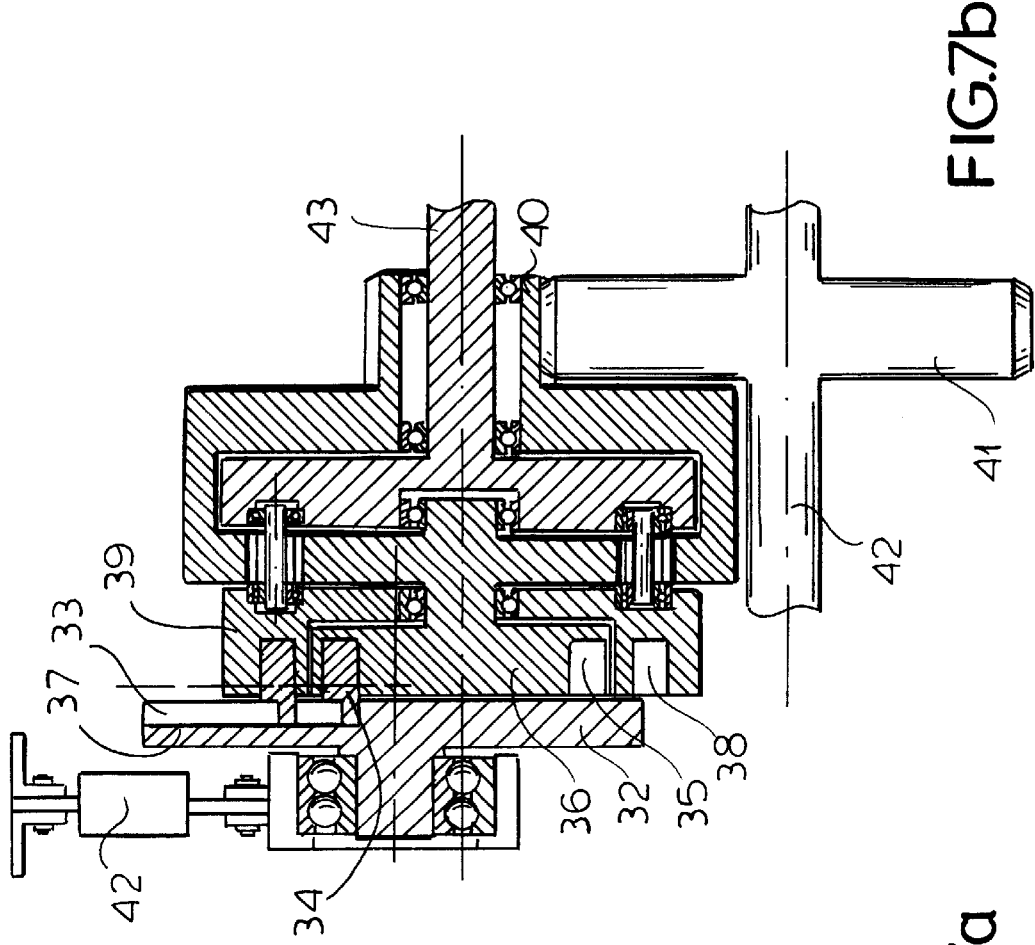
FIGS. 7a and 7b are top and sectional views of a drive unit according to the invention formed as a planetary-gear drive.
Figure 7A:
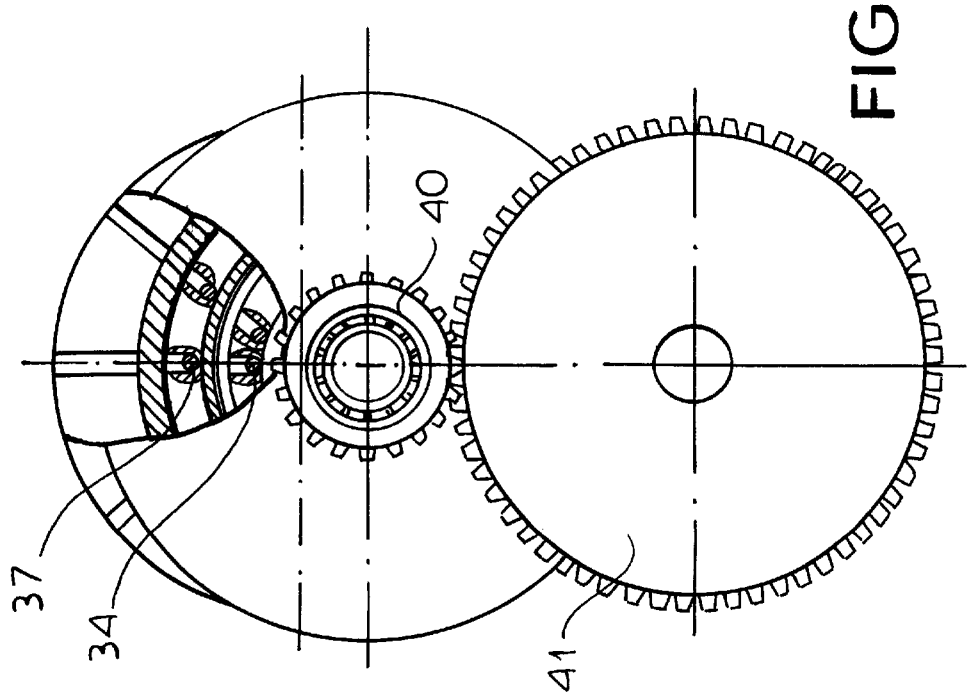

The above-described principle can be used in various manners within the scope of the invention. Thus according to the embodiment of FIG. 1 the coupling bodies can be so arranged that the coupling mode is initiated by a rotation about an axis that is parallel to the rotation axes of the input and output elements 10 and 11 or—as shown in FIG. 2—by rotation about an axis that is substantially perpendicular to this rotation axis. It is further possible that instead of a star disk with radial grooves on both sides to make this disk such relative to the input disk 20 and output disk 30 that the disks 20 and 30 are on one and the same side so that one of the disks 30 engages radially over the other. Such an embodiment is shown in the planetary drive unit of FIGS. 7a and 7b. The rotatable disk 32 has grooves 33 in which are engaged both the pins 34 of the radial grooves 35 of the input disk 36 as well as the pins 37 of the coupling bodies which are engaged or guided in radial grooves 38 of an annular output disk 39. Rotation of the output disk 39 is transmitted via a gear 40 to a gear wheel 41 on an output shaft 42. In the embodiment shown in FIG. 7b a hydraulic cylinder 42 serves for the eccentric positioning of the disk 32. On such eccentric positioning of the disk 32 the rotation of the input shaft 43 is transformed according to the eccentric offset corresponding to the drive parameters into different-speed rotation of the output disk 32.

Figure 6B:
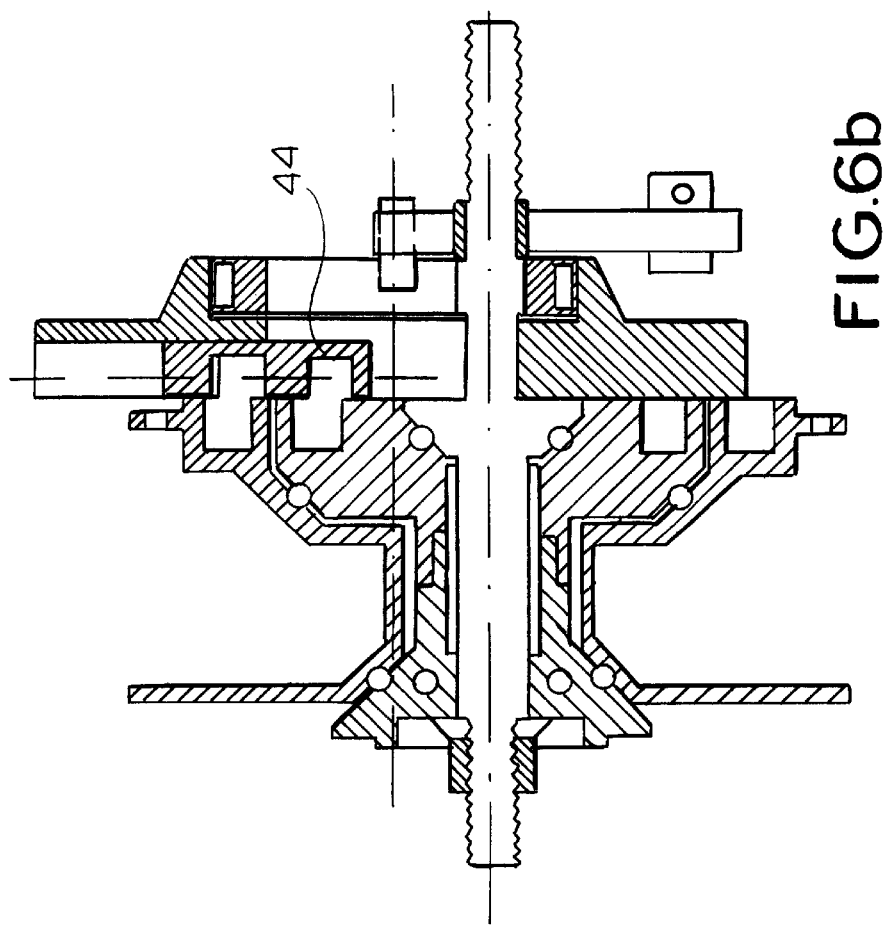
FIGS. 6a and 6b are top and sectional views of a drive unit according to the invention usable for a bicycle.
Figure 6A:
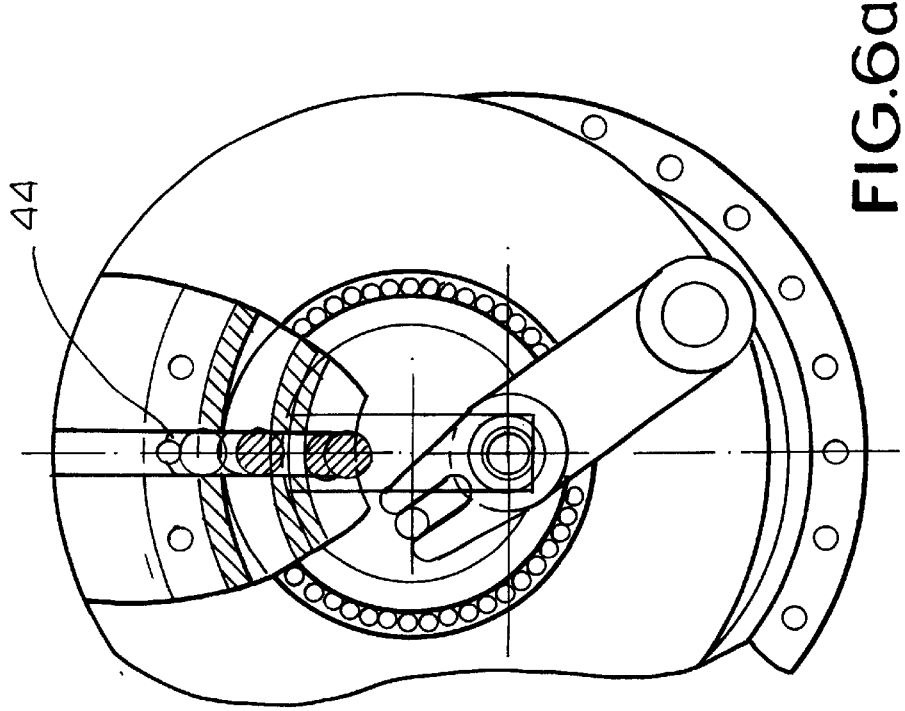

According to the embodiment of FIGS. 6a and 6b which is formed as a bicycle planetary-gear transmission, the coupling-body pins are held in a radially movable slide 44 that takes the place of the output disk formed with radial grooves. Radial shifting of the slide 44 can change the transmission ratio.

Figure 9:
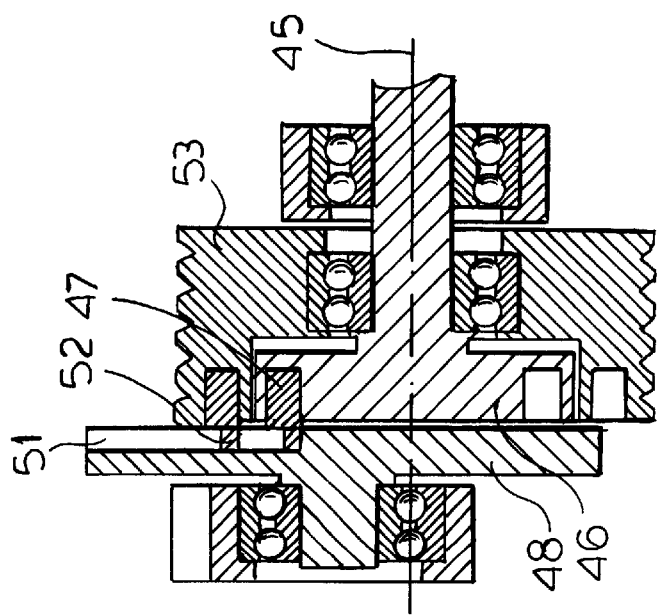
FIGS. 8 and 9 are top and sectional views of a drive unit according to the invention as a drive for an auxiliary device.
Figure 8:
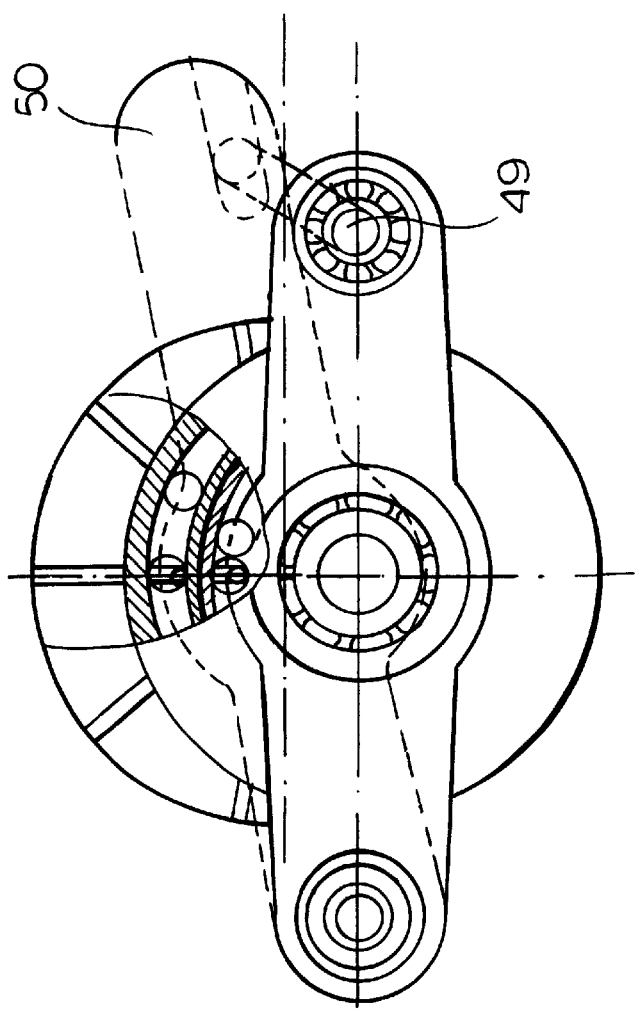

An embodiment usable as a drive for accessories or a power takeoff is shown in FIGS. 8 and 9. Rotation inputted by an input shaft 45 is transmitted by means of a disk 46 and coupling bodies 47 that are movable circularly or wedgeable in corresponding annular grooves to a disk 48 that is movable eccentrically of the axis of the shaft 45 for example from position 49 to position 50. In this manner the pins 52 of the coupling elements anchored in a pulley 53 and engaged in the radial grooves 51 of the disk 48 change the transmission ratio according to eccentric offset. Instead of a hydraulic adjuster the eccentric offset is set by a servomotor (controllable stepping motor or the like).

Further variations, in particular aimed at compensating for irregularities in transmitting torque are addressed as described in WO 95/03503, it being understood that instead of the one-way clutches according to the prior art the transmissions according to the invention are used.

Figure 10:
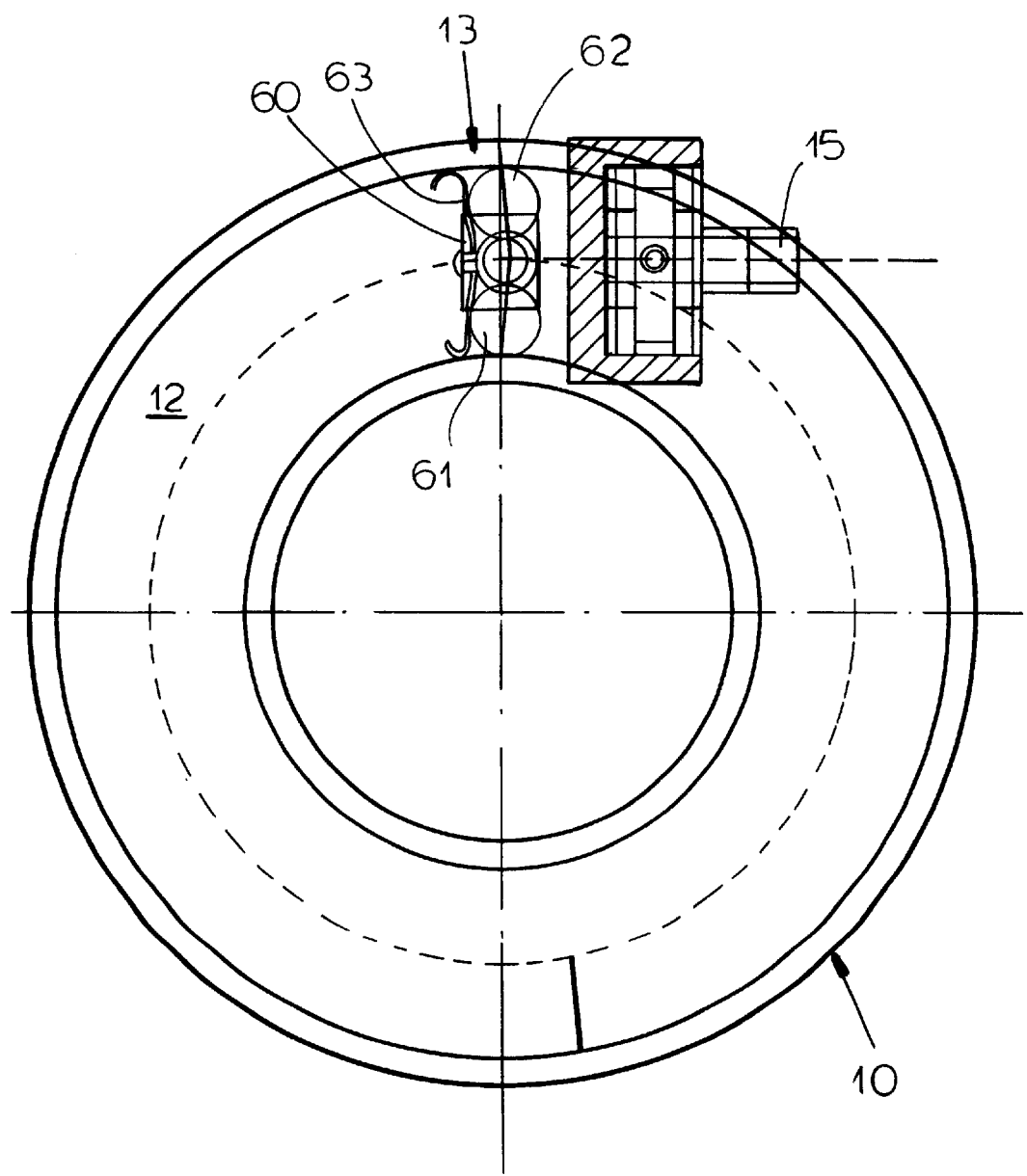
FIG. 10 is a top view of an input element with a coupling element guided in a groove.

As shown in FIG. 10 the coupling element 13 that can slide or wedge in a groove 12 of the input element 10 is formed of several parts, namely a contact body formed of a base 60 and two rollers 61 and 62 whose force presses the rollers 62 and 61 against walls of the groove 12. The base 60 is provided with an axially projecting pin 15 that engages in a corresponding recess of an output element, preferably in a groove 17 (see FIGS. 1 and 2).

Figure 11:
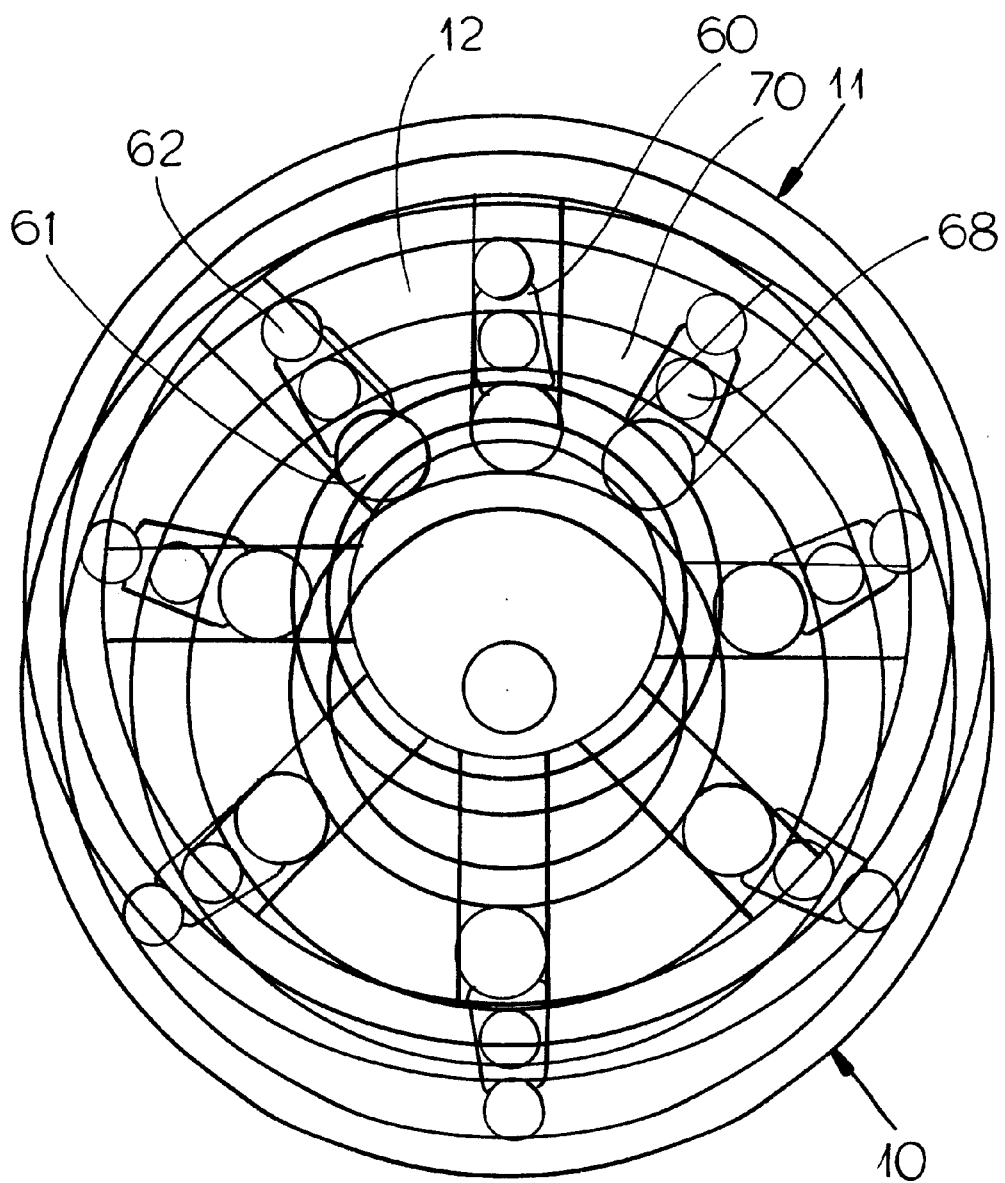
FIG. 11 is a diagram of an input element and an output element with several coupling elements.
Figure 12:
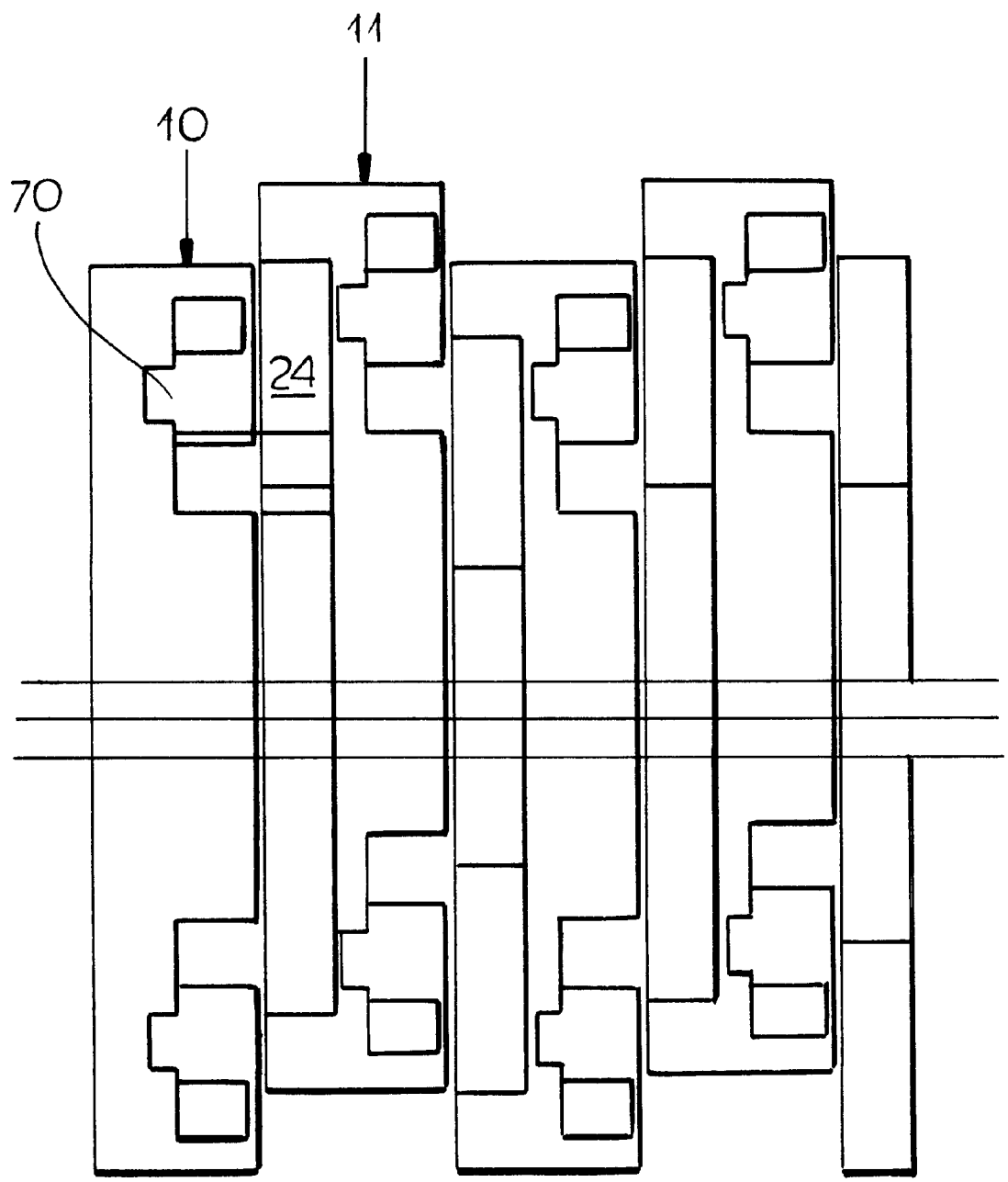
FIG. 12 is a diagram of a multistage drive according to FIG. 11.

The illustration of FIG. 11 shows a further embodiment where the base 60 is connected with a pin 68 that is guided in a groove 70 that is arranged in the floor of the annular groove 12. The contact bodies are rollers 61 and 62 which ride along the walls of the groove 12. This embodiment can according to FIG. 12 be set up as a multispeed drive unit (here with two input and output disks 10 and 11).

Figure 13:
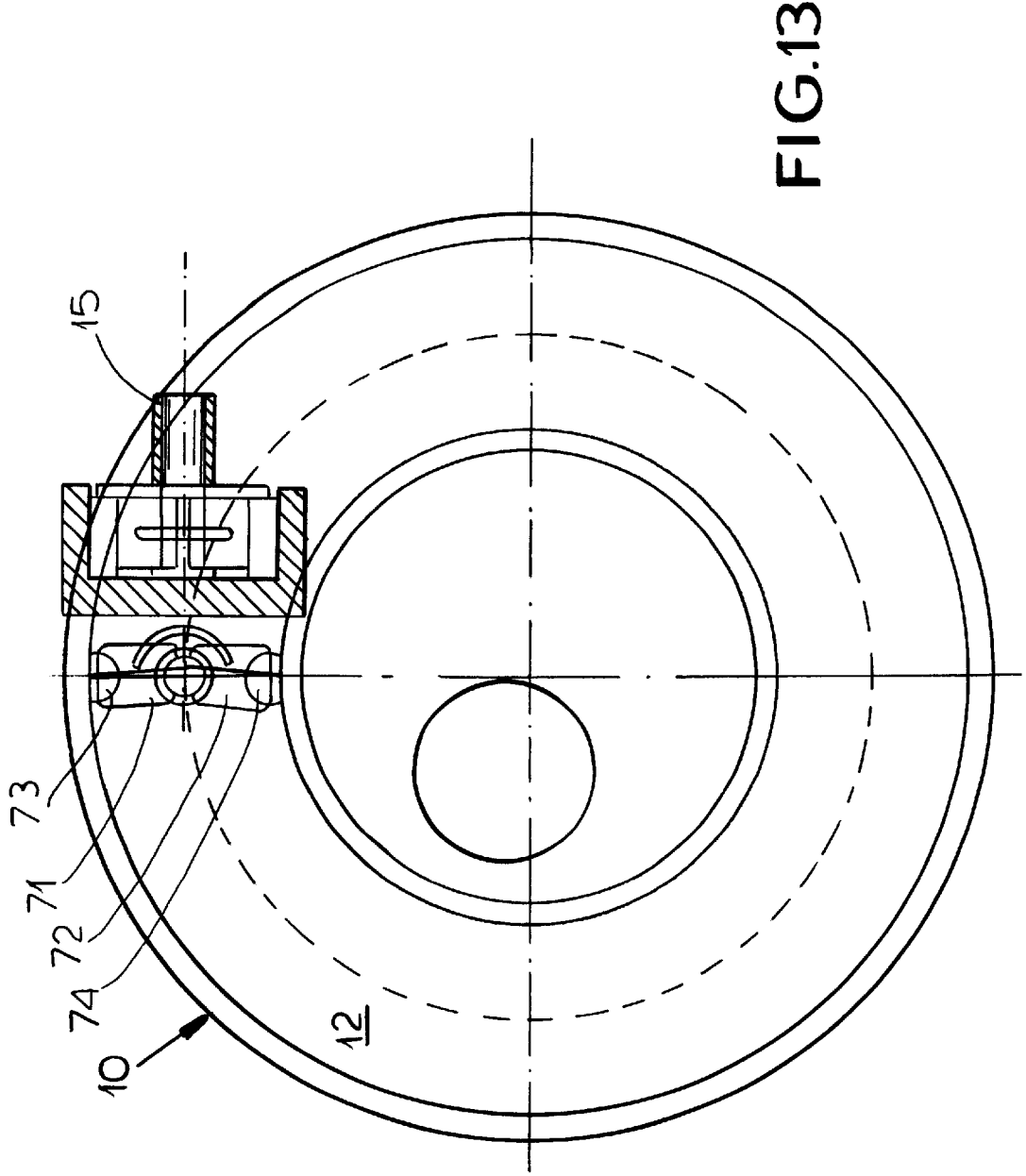
FIG. 13 is a top view of an input element with another embodiment of a coupling element.
Figure 14:
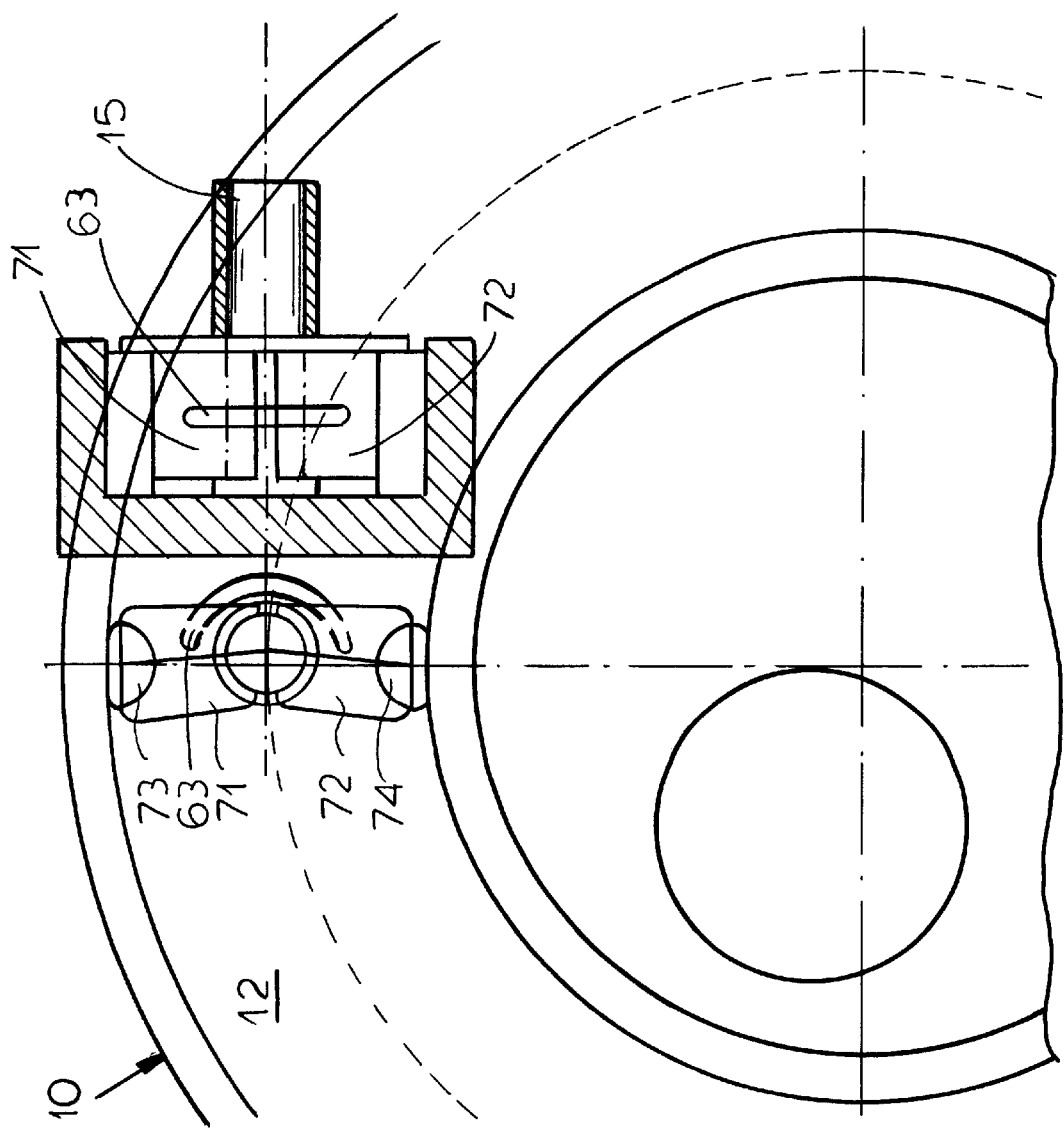
FIG. 14 is a corresponding enlarged illustration of the coupling element according to FIG. 13.

A further embodiment is shown in FIGS. 13 and 14. The base is here formed of two parts 71 and 72 which as shown in the sectional view form seats with their ends turned toward the walls of the groove 12 receiving complementary portions of contact bodies 73 and 74 which can be urged by a spring 63 into the coupling position with the input element formed by the disk 10. The surfaces of the contact bodies 73 and 74 engaging the walls of the groove 12 have the same radius of curvature as these walls. In this manner substantial surface contact is obtained.

Figure 16:
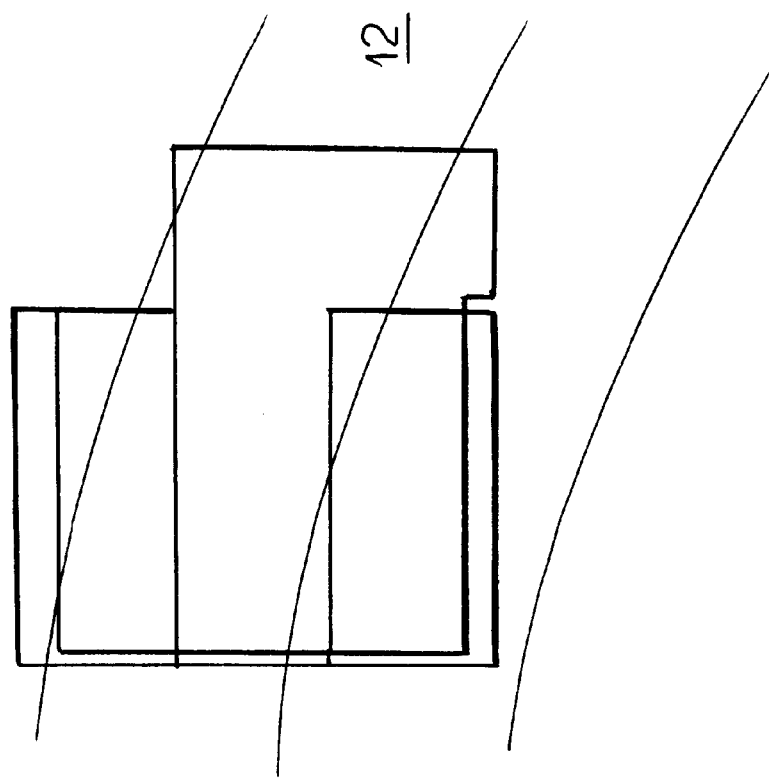
FIGS. 15 to 18 illustrate further embodiments of a coupling element.
Figure 15:
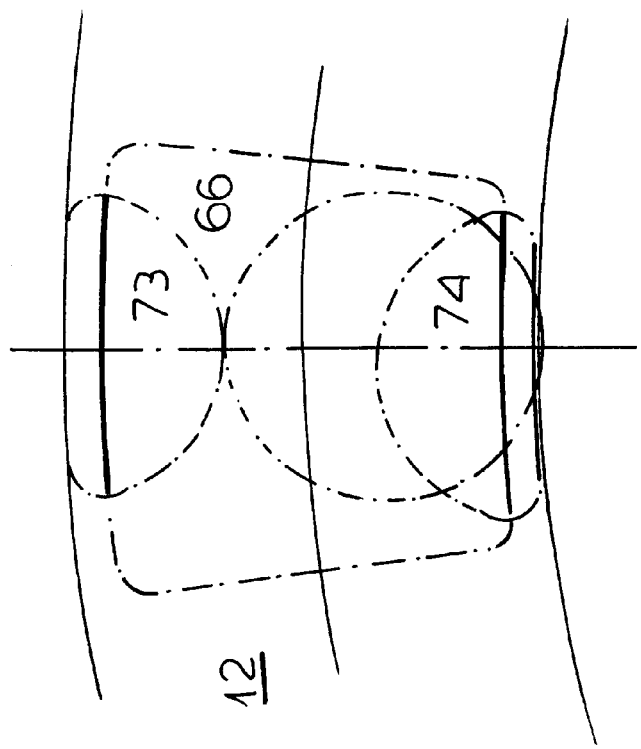

FIGS. 15 and 16 show an embodiment with a one-piece base 66 that has on opposite sides contact bodies 73 and 74 as described above in corresponding seats.

Figure 17:
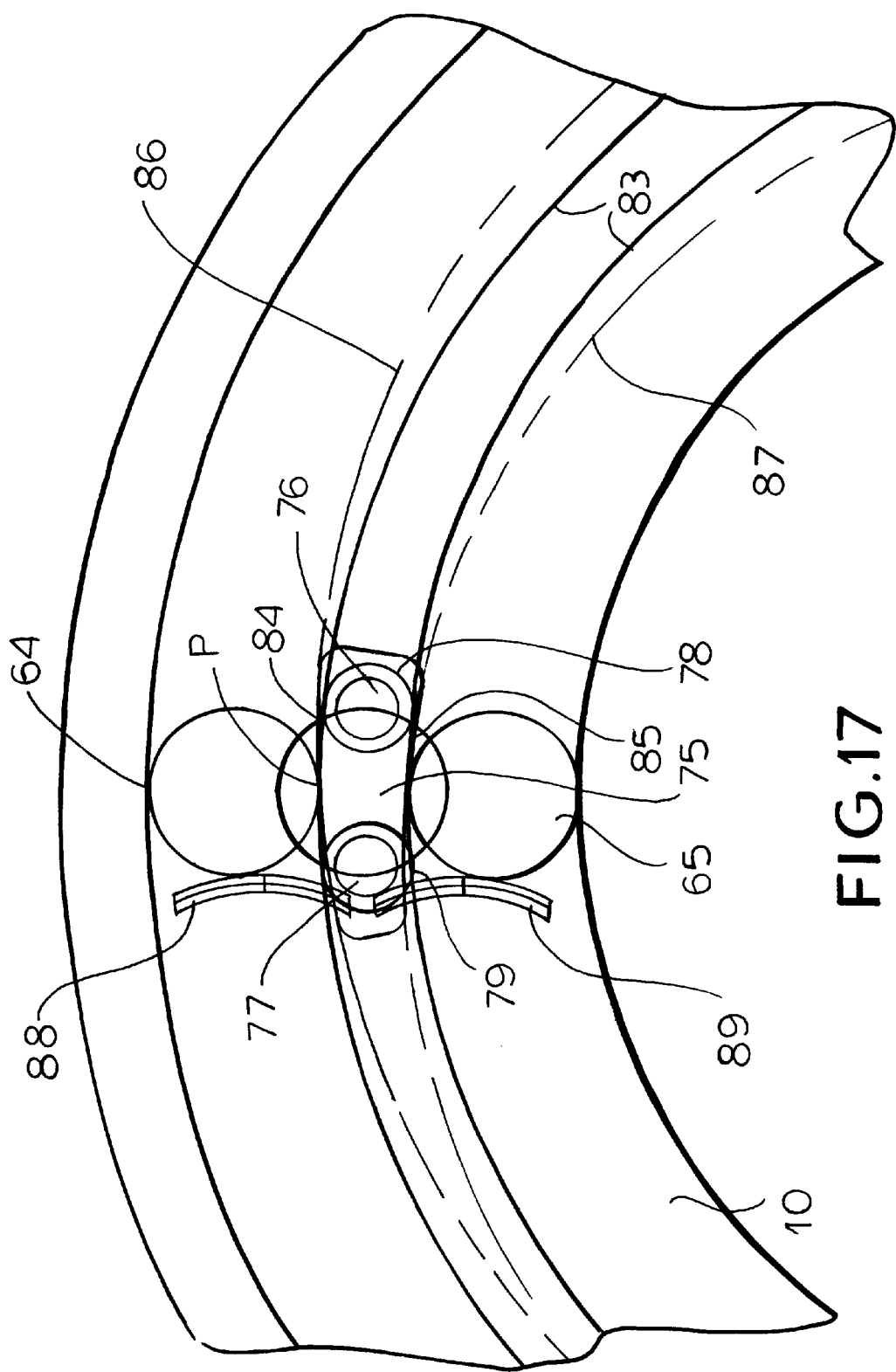

In the embodiment according to FIG. 17 rotation of the coupling body is completely eliminated so that problems with respect to tolerances and wear are substantially reduced. To this end the coupling rollers 64 and 65 are mounted on a base 75 which in turn is prevented from rotating by pins 76 and 77 provided with sleeves 78 and 79 riding in a groove 83 of the input element 10. The surfaces of the base 75 turned toward the coupling rollers 64 and 65 are such that in any position in which the coupling rollers 64 and 65 wedge because of wear, tolerances, or elasticity, the same coupling angle is produced. In the embodiment of FIG. 17 the shape is shown by the dashed lines 86 and 87. The corresponding concave surfaces 84 and 85 of the base 75 can be shaped such that initially circles centered on the input element 10 are drawn through the respective contact points P between the coupling rollers 64 and 65 with the base body 75 and the circle is then shifted by the actual coupling angle, for example 4°, from this point so that the base body 75 forms a narrowing ramp with the annular groove 12 in which the coupling bodies 64 and 65 roll. At point P the base 75 has a height with zero tolerance, that is the difference between the coupling groove dimension minus both roller diameters is the nominal dimension. Wire springs 88 and 89 that are connected at one end with the base 75 serve for pushing out the coupling rollers 64 and 65.

Figure 18:
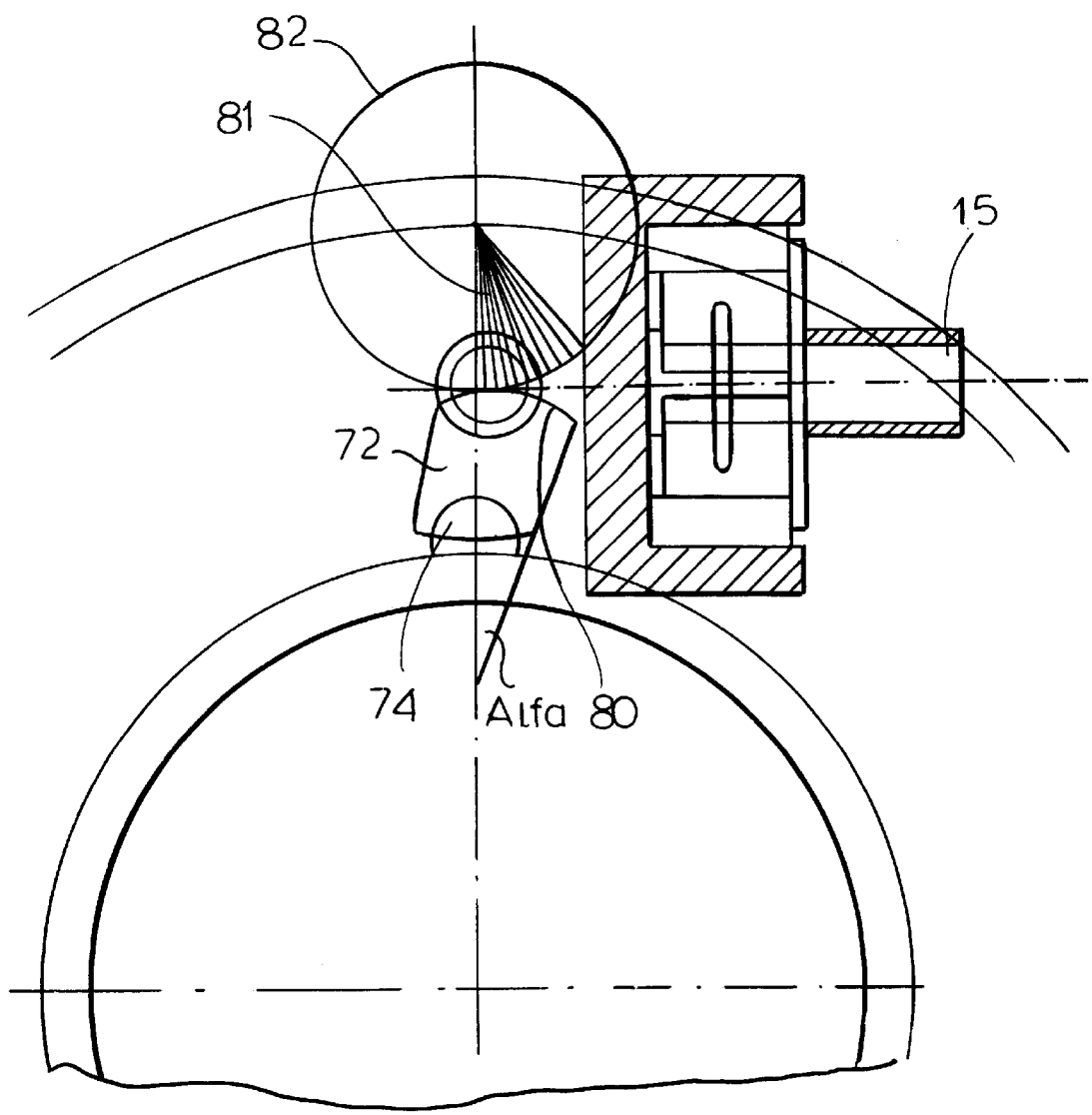

FIG. 18 shows a further development of the embodiment according to FIG. 13 wherein the upper base part and the respective coupling body are not shown for clarity of view. In the embodiment of FIGS. 13 (and 14) there is the disadvantage that with an assumed wedge angle of 4° the length of the coupling body is only larger than the gap by a factor of $1/(\cos 4°)=1.002442$. With a coupling-gap width of e.g. 10 mm thus the coupling body is only about 2.4/100 mm longer than the coupling gap which means that with modest wear or slight elasticity in the coupling body or in the annular groove the coupling angle decreases drastically and in some circumstances can be less than 0 so that the coupling body slips.

In order to deal with this the surface 80 where the two bases 71 and 72 engage each other and which roll off each other when the coupling angle $\alpha$ changes is not circular but is of greater radius of curvature with increasing coupling angle $\alpha$. The recess for the pin 15 serves only for transmitting the torque, the normal forces of the coupling action are transmitted directly via the base bodies 71 and 72 to each other.

The shape 80 of the mutually engaging surfaces of the bases 71 and 72 can be shaped iteratively out of the fan-like support radii with each succeeding radius being turned relative to the preceding one by 4° mathematically about the same center. Each succeeding radius increases in length by the factor $1/(\cos 4°)$ (assuming that the coupling angle is 4°; otherwise any other angle is used). The effective overall height of the coupling body thus increases as the coupling angle $\alpha$ decreases since, when the two bases 71 and 72 roll off each other on the surface 80, the support radii become bigger at the instantaneous contact point. The surface 80 is preferably shaped in section as a logarithmic spiral as shown in FIG. 18. Alternatively other shapes can be employed with which the wear characteristics or the elasticity of the parts or other influences which affect the angle α of the coupling action can be set such that a sure wedging without the danger of slipping is obtained.

Figure 19:
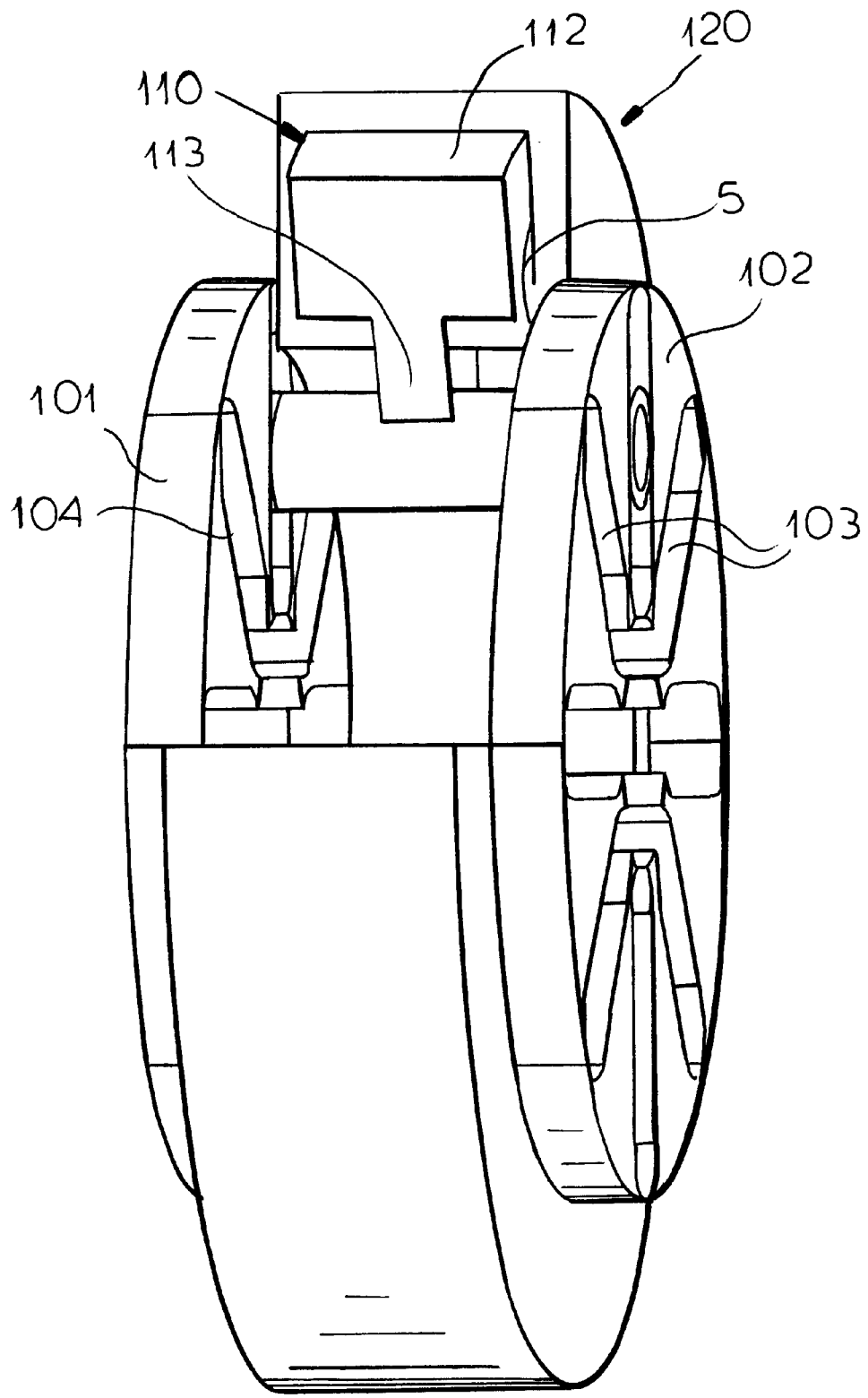
FIG. 19 is a further embodiment of a transmission according to the invention in a perspective view.
Figure 20:
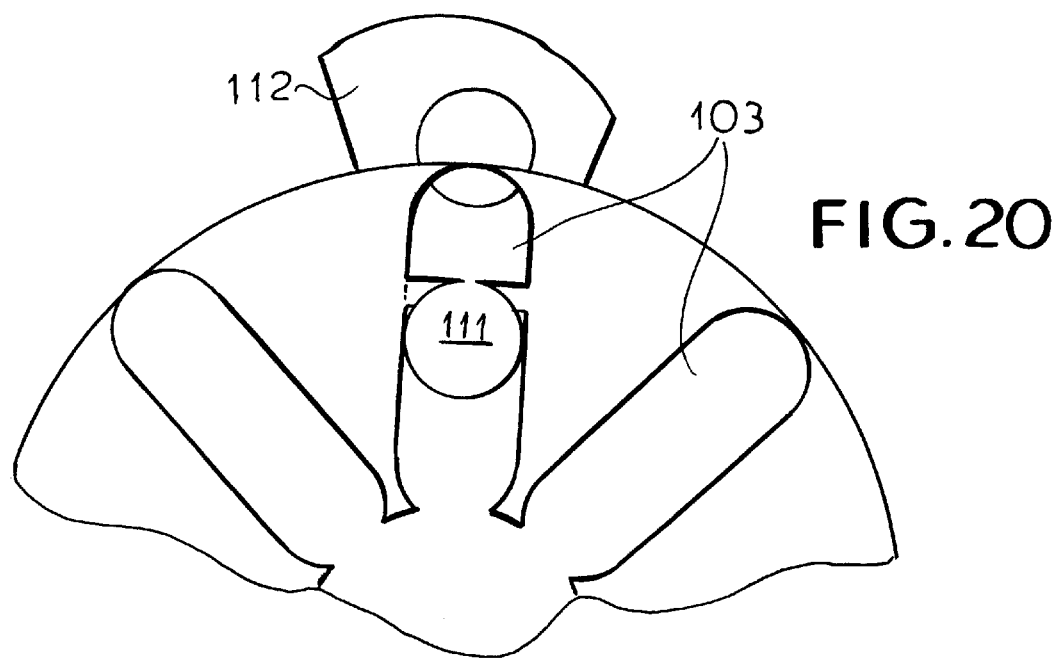
FIG. 20 is a partial top view of the FIG. 19 embodiment in enlarged view.

In the system of FIG. 19 the output element is formed by two disks 101 and 102 which are connected together by a common shaft. These disks 101 and 102 have respective radial grooves 103 and 104 formed as radial guides for ends of coupling-body pins 111 of a coupling body 110 that is comprised of the actual coupling body 112 that can tip in an annular groove of the input disk 120 and that further is formed of a pin 113 extending transversely out of the annular-groove surface and a pin transverse thereto whose ends 111 extend past the ends of the input element 120. The parts 112, 113, and 111 are formed as one piece. The coupling body 110 has as a result of the selected radial guides 103 and 104 of the two star disks 101 and 102 only a single degree of freedom, namely that it can pivot from the torque-transmitting position into the slip position about the longitudinal axis of the pins 111, and the two rotation axes of the output elements 101 and 102 and of the input element 120 are parallel. Canting of the coupling body 112 by tipping in another direction is thus effectively ruled out.

Figure 21:
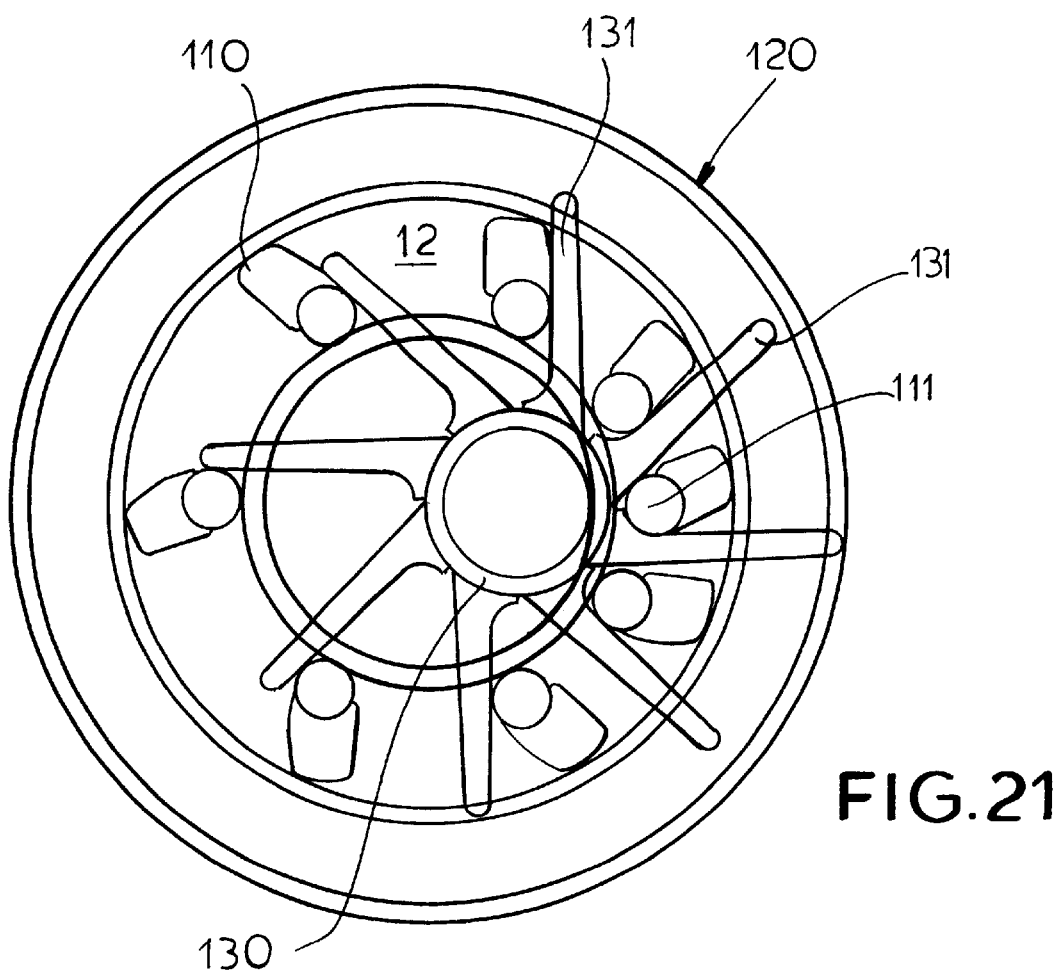
FIG. 21 is a further embodiment of the transmission according to the invention.

Instead of the disk-like output elements 101 and 102 according to FIG. 21 an output element can be used that is formed with teeth and that is comprised of a shaft 130 from which arms 131 extend radially. The arms 131 are tipped relative to a perpendicular from the surface of the shaft 130 by 40° to 50°. The coupling elements 110 are made the same as in FIG. 19 and run circularly in the radial-groove guides of the disk-shaped input element each of whose faces is juxtaposed with an output element formed by the parts 130 and 131. The arms 131 are acted on in the load-arc path by the pins 111 of the coupling element with the applied torque. In the load-free path, that is in the free-running phase, the coupling body 110 is entrained by an unillustrated wire or elastic ring by the arms 131. The output element 130, 131 is movable eccentrically relative to the input element 120.

Preferably each pin 111 is formed as a rotatable sleeve in order to minimize frictional losses.

The geometry of the interacting annular groove and the arms 131 is preferably such that torque transmission through the pins 111 only takes place close to the shaft 130. Torque transmission which according to FIG. 21 takes place in the right-hand side of the illustration (load-arc path) is via the pins 111 on the arms 131 in the arm portions that are closer to the shaft 130 while the outer portions of the arms are not subject to torque. In the load-free path on the left of the illustration the outer tips of the arms 131 are only stressed enough to entrain the coupling elements or pins 111 via elastic connections with the arms.

Since instead of the above-described radial grooves 12 the spaces between the arms 130 form the radial guides, the annular groove 12 must be made correspondingly wide so that its inner diameter is equal to the diameter of the shaft 130 and the desired extent of eccentric offset of the input element to the output element.

Of course in a transmission according to FIGS. 10 to 21 coupling elements as described above and shown in FIGS. 11 to 18 can be used.

Figure 22:
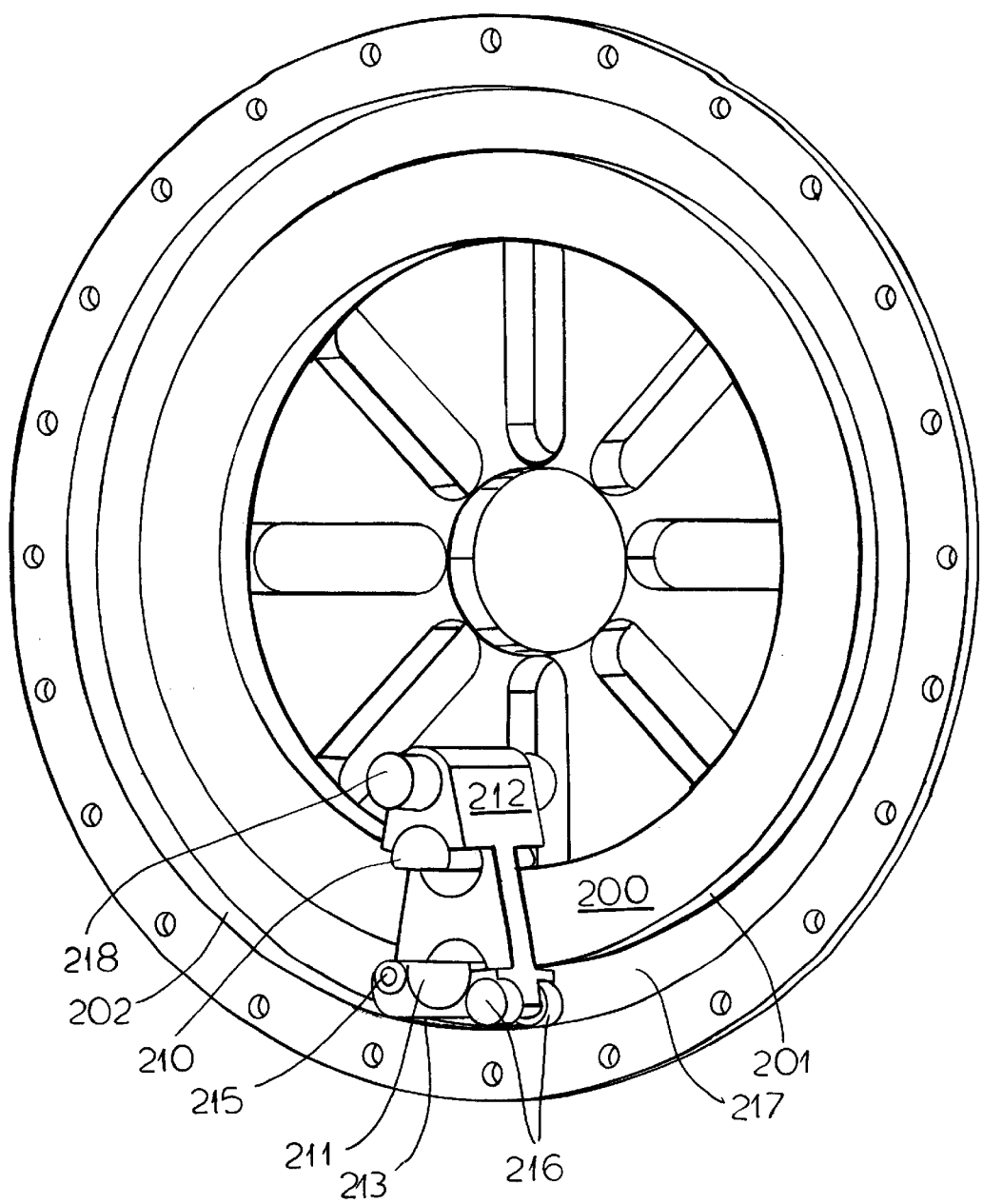
FIG. 22 is an embodiment of a transmission according to the invention with an annular guide for the coupling element.
Figure 23:
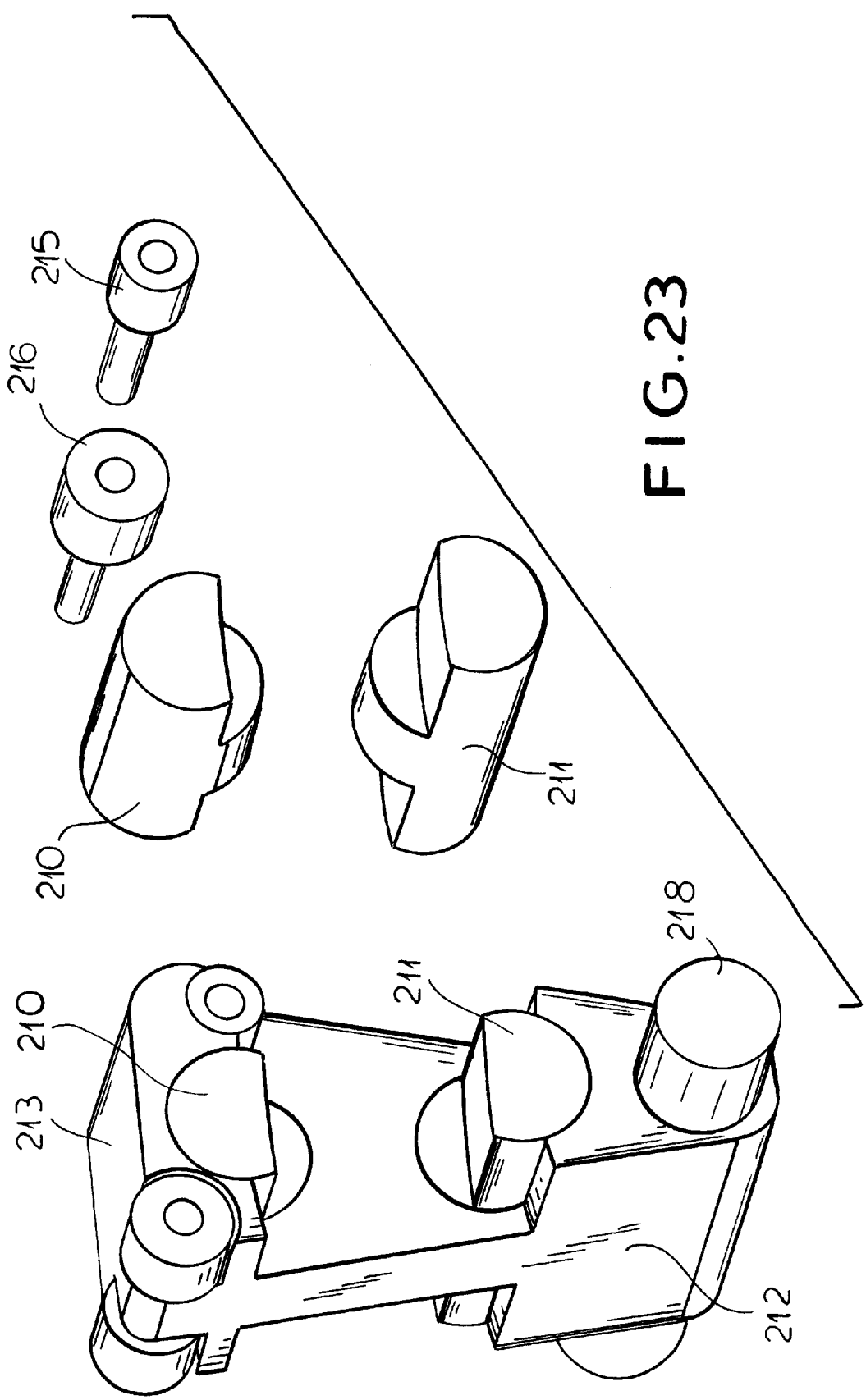
FIG. 23 is an enlarged perspective view of a coupling element.

As shown in FIGS. 22 and 23, this transmission embodiment uses instead of an annular groove a coupling ring 200 which in the coupling mode transmits torque via the coupling stones 210 and 211 by friction. The coupling stones 210 and 211 each ride in a concave seat of a respective body 212 and 213. The curved face of the coupling stone 211 matches the radius of the outer edge surface 201. The same is true for the inner edge surface 202 which corresponds to the radius of the slightly convex face of the coupling stone 210. The part 212 has roller pairs 215 and 216 that roll on the corresponding annular surfaces of the groove 217 in the free-running position. Tipping of the coupling element shown in FIG. 23 presses the coupling stones in surface contact on the annular edge surfaces 201 and 202. The bolt 218 lies in the bore and projects past at both ends so that its ends can be guided in radial grooves as described above. The use of a coupling ring 200 instead of a coupling groove holding coupling bodies has the advantage that the coupling ring is only subjected to compression and not to bending stresses so that even when made small the input and output disks can transmit considerable torque. This prevents that when wedged the coupling elements "bend out" the annular groove. Otherwise this embodiment functions the same as those of FIGS. 1 to 21.

Figure 24:
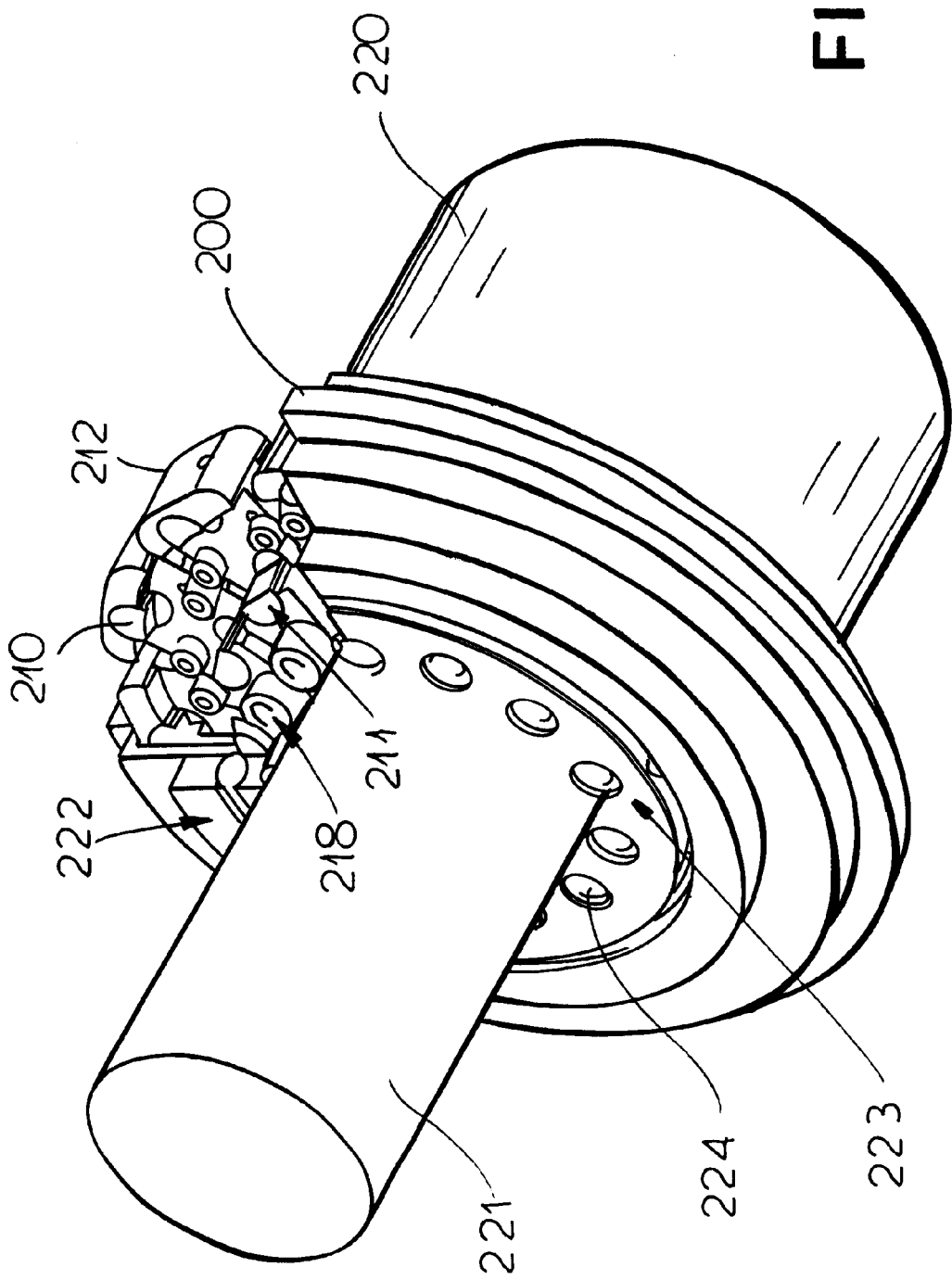
FIG. 24 is a perspective view of an alternative embodiment according to the invention.

The embodiment shown in FIG. 24 has an input shaft 220 and an output shaft 221 which are journaled on each other via a roller bearing 222. Torque is transmitted in the coupling mode from the coupling ring 200 via the contact bodies (coupling stones) 210 and 211 and the bases 212 through the coupling-body pin 218 that is guided in bores 224 of the disk 223 on the shaft 221.

The transmission according to FIG. 24 is preferably (ignoring the eccentric adjustability of the input element) so constructed relative to the output element as shown in FIG. 19 and described above, thus in two pieces. The output element thus has two disks 223 that are arranged mirror-symmetrical to each other relative to the axis. Correspondingly the input element is made in two pieces. This construction facilitates a tangential force and thus torque transmission between the coupling-body pins 218 and the respective disks 223 in a symmetrical arrangement so as to produce a generally homogenous force distribution on the active contact zones of the annular disks.

The bores 218 as well as the bearings can thus be constructed to cancel out tolerance problems with respect to alignment and running between the two shafts 220 and 221 without thereby influencing the functioning of the clutch action of the coupling bodies.

In addition the construction of the coupling elements corresponds to that shown and described with reference to FIGS. 22 and 23.

Where in the above description the output element is described as a disk with radially extending grooves and the input element as a disk with an annular groove or an annular body, the scope of the invention in an analog manner includes embodiments where the output element has annular guides and the input element is a disk with radially extending grooves.

What is claimed is:

1. A variable-speed transmission comprising:
   a first element rotatable about a first axis and having an annular guide centered on the first axis;
   a second element rotatable about a second axis parallel to the first axis and having a plurality of radially extending arms having edges forming respective angularly spaced and radially extending guides;
   respective coupling bodies angularly spaced about the axes and each having one part engaged with a respective one of the radial second-element guides and another part engaged with the annular first-element guide, the other parts being constructed such that they can slide in one angular direction relative to the annular guide but not in an opposite angular direction relative thereto; and means for radially displacing one of the elements relative to the other element into a position with the second and first axes offset from each other for, on relative rotation of the first element in the one direction relative to the second element, orbiting the bodies through a torque-transmitting zone close to the second axis and wedged on the annular first-element guide and through a free-running zone remote from the second axis and sliding on the annular first-element guide, whereby on traversing the torque-transmitting zone the bodies rotationally couple the first and second elements.

2. The variable-speed transmission defined in claim 1 wherein the first element is a disk and the annular guide is an axially open groove formed in the disk.

3. The variable-speed transmission defined in claim 1 wherein the annular guide is a ring and the bodies each have two members engaging radial inner and outer faces of the ring.

4. The variable-speed transmission defined in claim 1 wherein the second element is a disk and the radial guides are axially open grooves formed in the disk.

5. The variable-speed transmission defined in claim 1 further comprising respective springs urging the bodies into engagement with the annular guide.

6. A variable-speed transmission comprising:

a pair of first elements spaced apart along and rotatable about a first axis and having respective axially confronting annular guides centered on the first axis;

a second element rotatable between the first elements about a second axis parallel to the first axis and having a plurality of angularly spaced and radially extending guides;

respective coupling bodies angularly spaced about the axes and each having one part engaged with a respective one of the radial second-element guides and a pair of axially aligned first pins engaged with the respective annular first-element guides, the other parts being constructed such that they can slide in one angular direction relative to the annular guide but not in an opposite angular direction relative thereto; and means for radially displacing one of the elements relative to the other element into a position with the second and first axes offset from each other for, on relative rotation of the first element in the one direction relative to the second element, orbiting the bodies through a torque-transmitting zone close to the second axis and wedged on the annular first-element guide and through a free-running zone remote from the second axis and sliding on the annular first-element guide, whereby on traversing the torque-transmitting zone the bodies rotationally couple the first and second elements.

7. The variable-speed transmission defined in claim 6 wherein the first elements are disks and the annular guides are axially open and confronting grooves formed in the disks.

8. A variable-speed transmission comprising:

a first element rotatable about a first axis and having an annular guide centered on the first axis;

a second element rotatable about a second axis parallel to the first axis and having a plurality of angularly spaced and radially extending guides;

respective bases radially displaceable in the guides;

respective coupling bodies carried on the bases and each having a part engaged the annular first-element guide and constructed such that the parts can slide in one angular direction relative to the annular guide but not in an opposite angular direction relative thereto; and means for radially displacing one of the elements relative to the other element into a position with the second and first axes offset from each other for, on relative rotation of the first element in the one direction relative to the second element, orbiting the bodies through a torque-transmitting zone close to the second axis and wedged on the annular first-element guide and through a free-running zone remote from the second axis and sliding on the annular first-element guide, whereby on traversing the torque-transmitting zone the bodies rotationally couple the first and second elements.

9. The variable-speed transmission defined in claim 8 wherein each coupling body comprises a pair of members pivoted on the respective base about axes parallel to the first and second axes, the members bearing on respective sides of the annular guide.

10. The variable-speed transmission defined in claim 9 wherein the members bear radially on each other.

* * * * *